(12) United States Patent
Zisapel et al.

(10) Patent No.: US 6,665,702 B1
(45) Date of Patent: Dec. 16, 2003

(54) LOAD BALANCING

(75) Inventors: Roy Zisapel, Tel Aviv (IL); Amir Peless, Tel Aviv (IL); Smadar Fuks, Tel Aviv (IL)

(73) Assignee: Radware Ltd., Tel Aviv (IL)

( * ) Notice: Subject to any disclaimer, the term of this patent is extended or adjusted under 35 U.S.C. 154(b) by 0 days.

(21) Appl. No.: 09/467,763

(22) Filed: Dec. 20, 1999

Related U.S. Application Data

(63) Continuation-in-part of application No. 09/115,643, filed on Jul. 15, 1998, now Pat. No. 6,249,801.

(51) Int. Cl.$^7$ .............................................. G06F 13/00
(52) U.S. Cl. ..................... 709/105; 709/238; 709/223
(58) Field of Search ................................ 709/238, 105, 709/223, 239

(56) References Cited

U.S. PATENT DOCUMENTS

| | | | |
|---|---|---|---|
| 5,774,660 A | | 6/1998 | Brendel et al. |
| 6,047,329 A | * | 4/2000 | Horikawa et al. ........... 709/238 |
| 6,070,191 A | | 5/2000 | Narendran et al. |
| 6,078,943 A | | 6/2000 | Yu |
| 6,098,108 A | * | 8/2000 | Sridhar et al. ............... 709/239 |
| 6,122,743 A | * | 9/2000 | Shaffer et al. ............... 713/201 |
| 6,185,619 B1 | * | 2/2001 | Joffe et al. ................... 709/229 |
| 6,249,801 B1 | * | 6/2001 | Zisapel et al. ............... 709/105 |
| 6,314,093 B1 | * | 11/2001 | Mann et al. ................. 370/351 |

OTHER PUBLICATIONS

Brochure: "CSD A Complete Solution for Enhancing Cache Server Farm Performance", RadWare Ltd., 1997.
Brochure: "WSD–DS", RadWare Ltd., 1997.
Brochure: "WSD–NP A Powerful Global Load Balancing Solution", RadWare Ltd., 1997.
Brochure: "WSD, WSD–Pro", RadWare Ltd., 1997.
B. Gengler, "RND Server Eases Web Site Congestion", Internetwork, 7(11) 1996.
R.J. Kohlhepp, "Web Server Director Keeps Intersections Clear", Network Computing, 1997.
A. Rogers, "Easing Web Jam With Distributed Servers", Communications Week, No. 632, 1996.
J. Taschek, "A Well–Balanced Web", Internet Computing, 1998.
P. Boyle, "Web Site Traffic Cops", PC Magazine, 1997.

* cited by examiner

*Primary Examiner*—Kenneth R. Coulter
(74) *Attorney, Agent, or Firm*—Finnegan, Henderson, Farabow, Garrett, & Dunner, L.L.P.

(57) ABSTRACT

This invention discloses a method for managing a computer network connected to the Internet through a network connection, such as different Internet Service Providers, including the steps of; sending polling requests through a plurality of routes from a computer network to a remote server computer, receiving replies from the remote server computer corresponding to the polling requests, and measuring proximities of the remote server computer to the computer network based on the received replies.

14 Claims, 20 Drawing Sheets

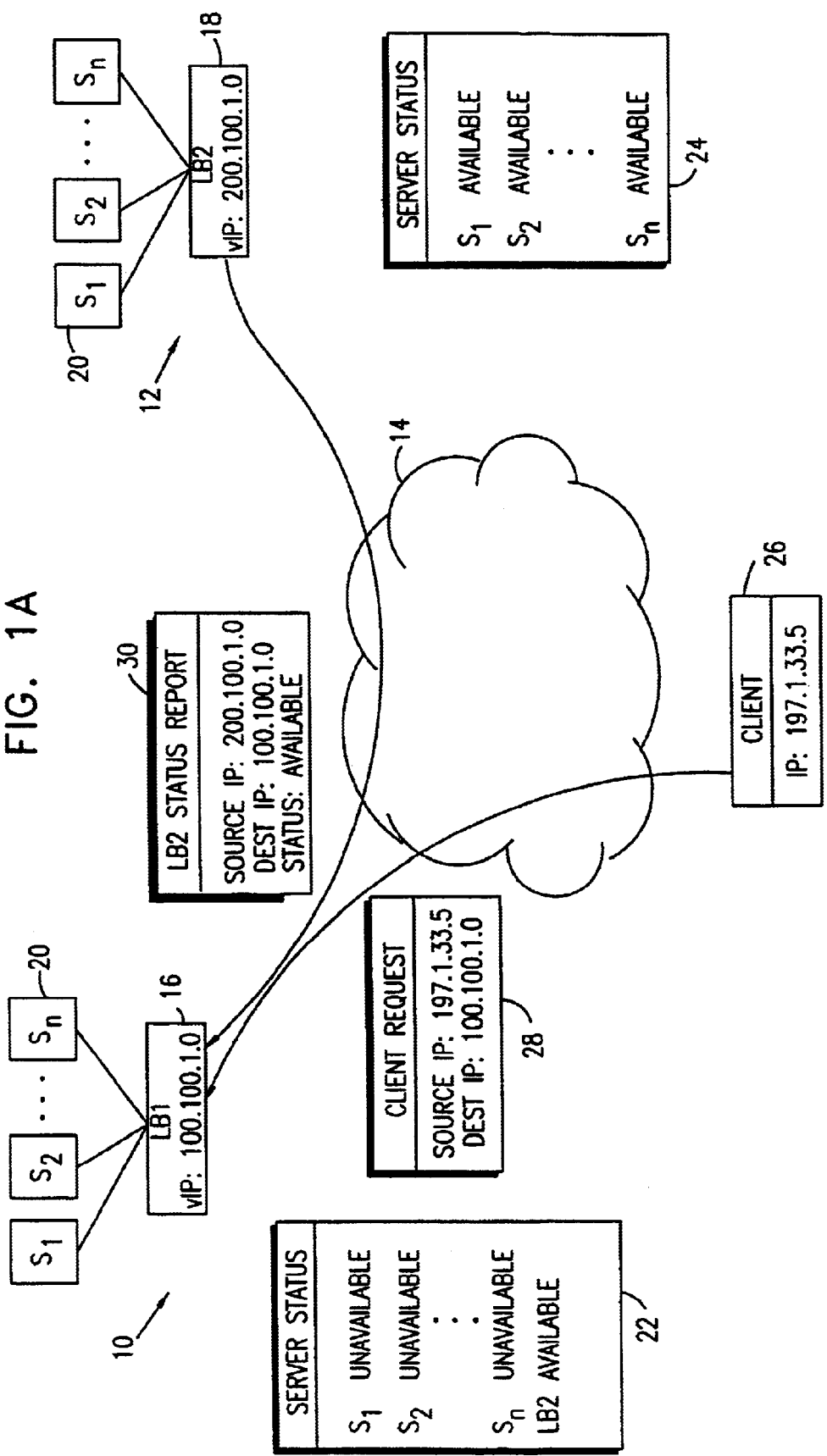

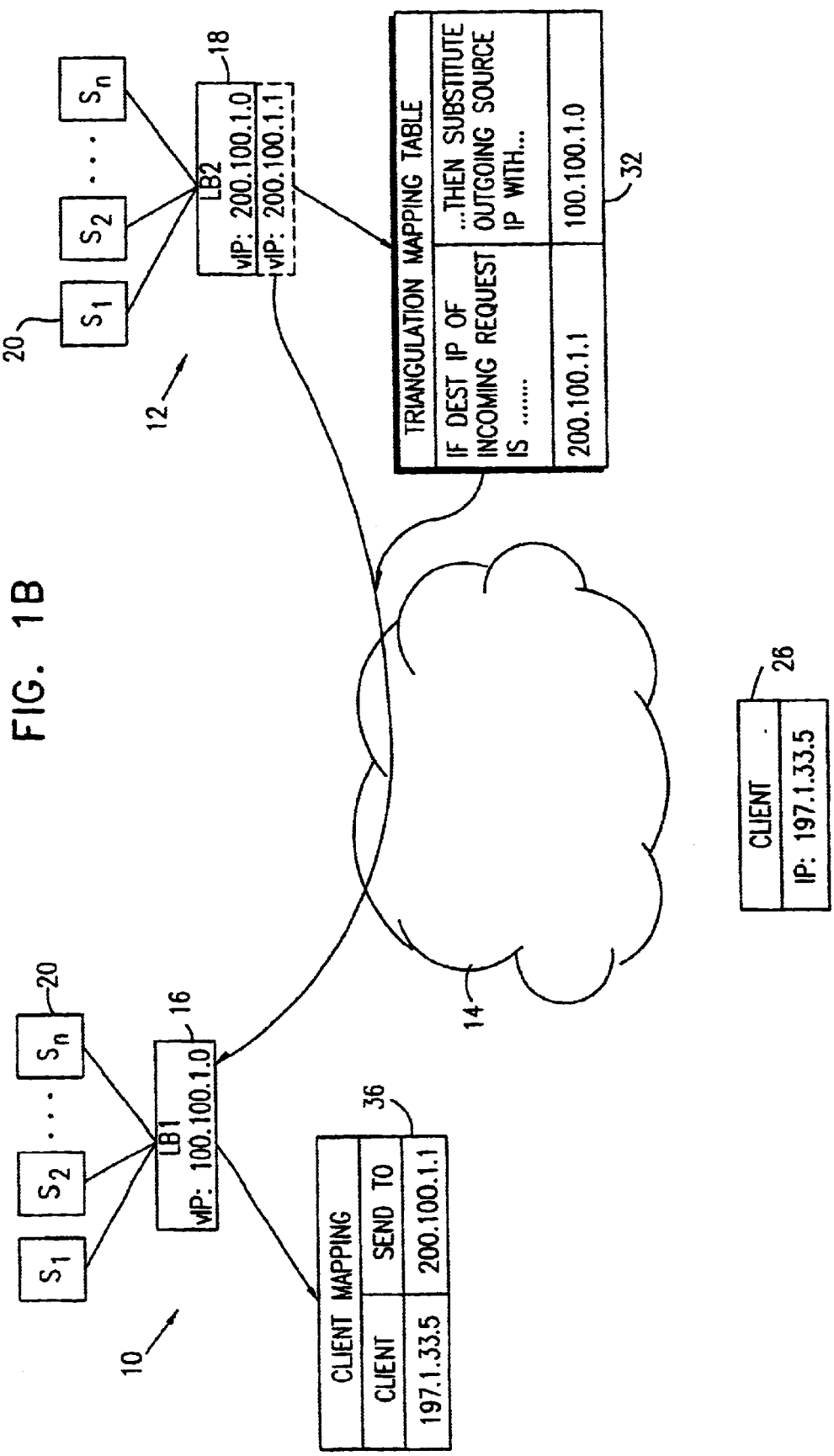

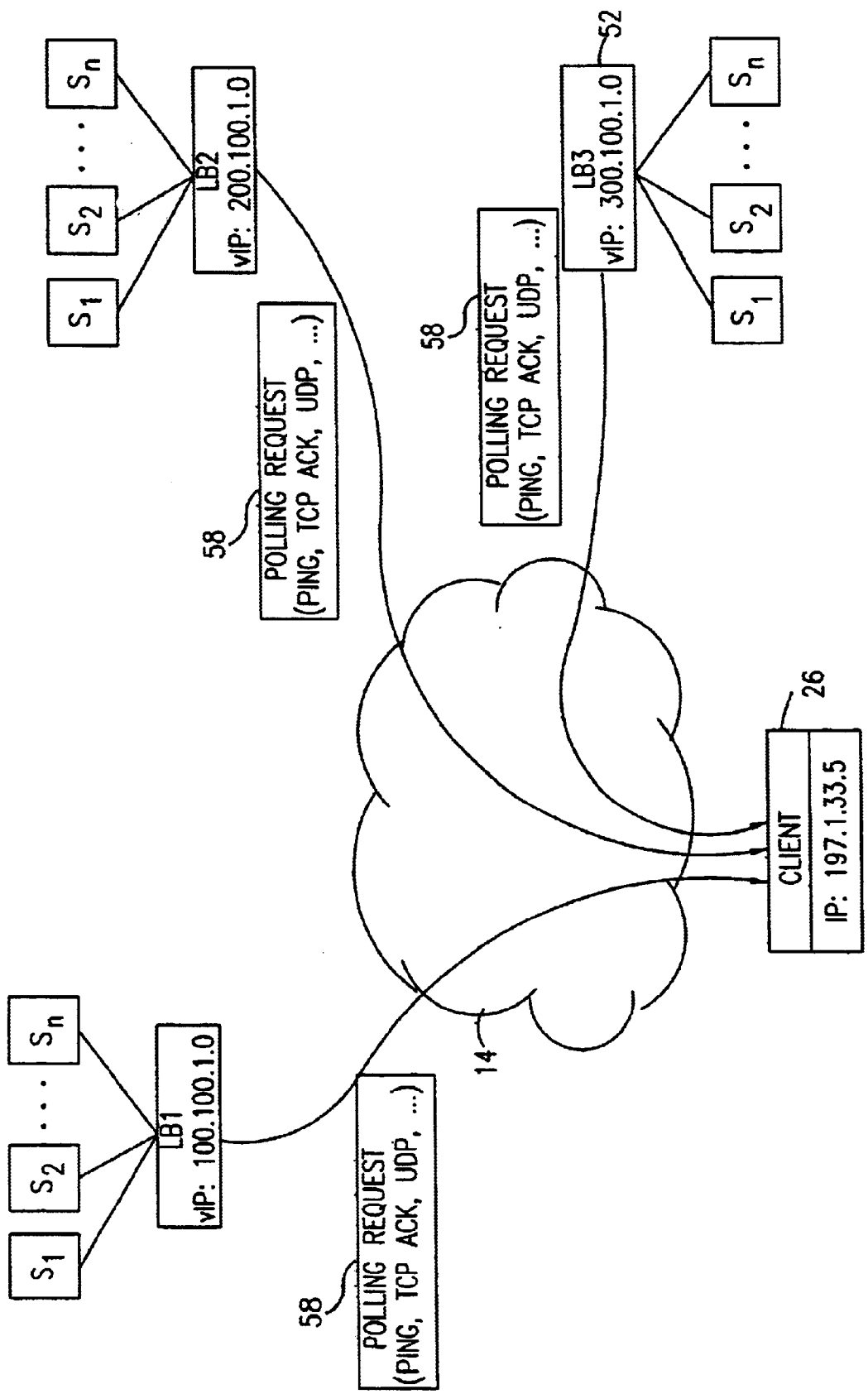

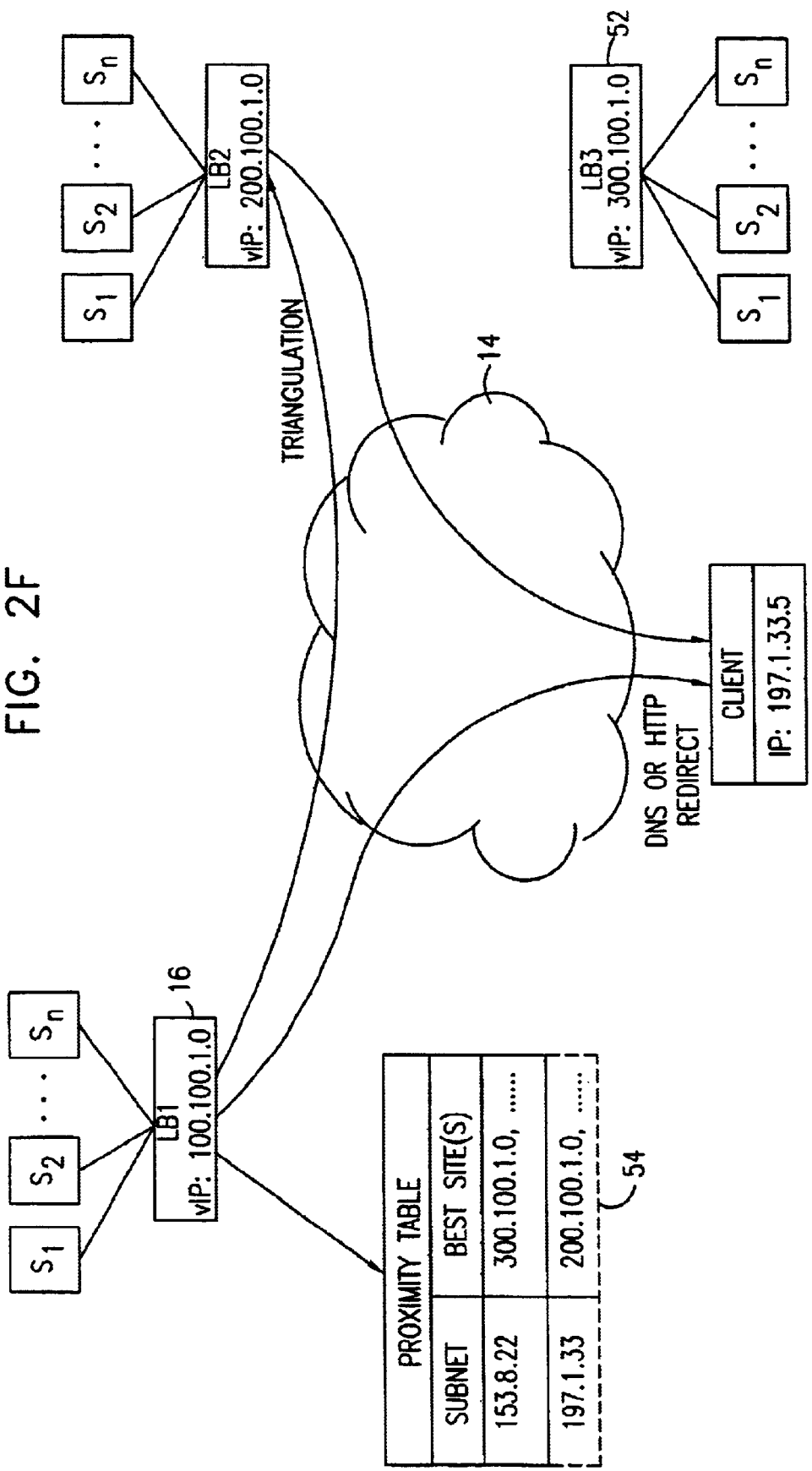

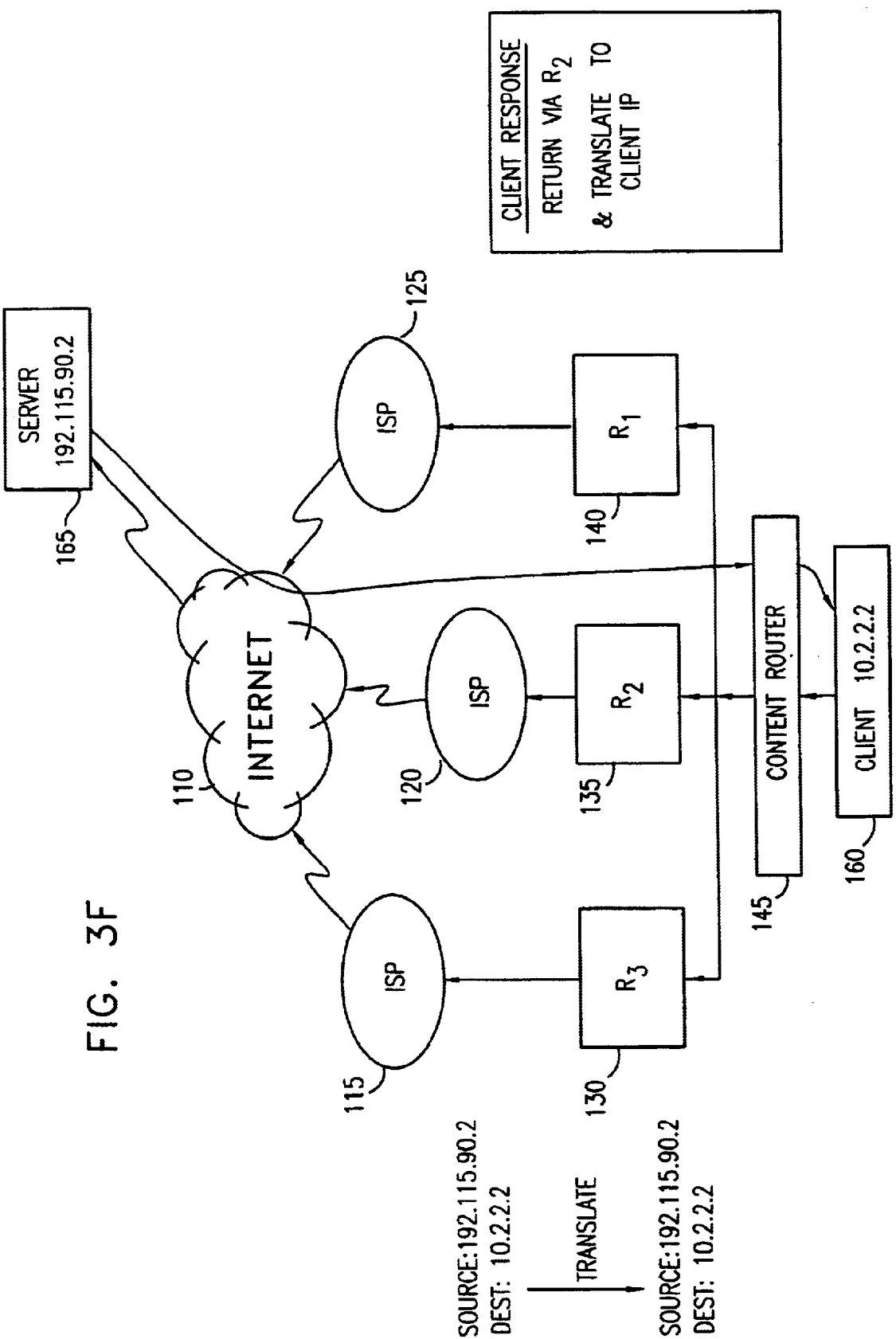

FIG. 7

| DESTINATION TABLE | | |
|---|---|---|
| | ROUTER $R_1$ | ROUTER $R_2$ |
| DESTINATION SUBNET$_1$ | HOPS = $h(1,1)$<br>RESPONSE TIME = $t(1,1)$<br>PACKET LOSS = $p(1,1)$ | $h(2,1)$<br>$t(2,1)$<br>$p(2,1)$ |
| DESTINATION SUBNET$_2$ | HOPS = $h(1,2)$<br>RESPONSE TIME = $t(1,2)$<br>PACKET LOSS = $p(1,2)$ | $h(2,2)$<br>$t(2,2)$<br>$p(2,2)$ |
| ... | ... | ... |

LOAD BALANCING

REFERENCE TO RELATED APPLICATIONS

This application is a continuation-in-part of assignee's application U.S. Ser. No. 09/115,643, filed on Jul. 15, 1998, and entitled "Load Balancing," now U.S. Pat. No. 6,249,801.

FIELD OF THE INVENTION

The present invention relates to computer networks in general, and in particular to load balancing client requests among redundant network servers in different geographical locations.

BACKGROUND OF THE INVENTION

In computer networks, such as the Internet, preventing a server from becoming overloaded with requests from clients may be accomplished by providing several servers having redundant capabilities and managing the distribution of client requests among the servers through a process known as "load balancing."

In one early implementation of load balancing, a Domain Naming System (DNS) server connected to the Internet is configured to maintain several IP addresses for a single domain name, with each address corresponding to one of several servers having redundant capabilities. The DNS server receives a request for address translation and responds by returning the list of server addresses from which the client chooses one address at random to connect to. Alternatively, the DNS server returns a single address chosen either at random or in a round-robin fashion, or actively monitors each of the servers and returns a single address based on server load and availability.

More recently, a device known as a "load balancer," such as the Web Server Director, commercially available from the Applicant/assignee, has been used to balance server loads as follows. The load balancer is provided as a gateway to several redundant servers typically situated in a single geographical location and referred to as a "server farm" or "server cluster." DNS servers store the IP address of the load balancer rather than the addresses of the servers to which the load balancer is connected. The load balancer's address is referred to as a "virtual IP address" in that it masks the addresses of the servers to which it is connected. Client requests are addressed to the virtual IP address of the load balancer which then sends the request to a server based on server load and availability or using other known techniques.

Just as redundant servers in combination with a load balancer may be used to prevent server overload, redundant server farms may be used to reroute client requests received at a first load balancer/server farm to a second load balancer/server farm where none of the servers in the first server firm are available to tend to the request. One rerouting method currently being used involves sending an HTTP redirect message from the first load balancer/server farm to the client instructing the client to reroute the request to the second load balancer/server farm indicated in the redirect message. This method of load balancing is disadvantageous in that it can only be employed in response to HTTP requests, and not for other types of requests such as FTP requests. Another rerouting method involves configuring the first load balancer to act as a DNS server. Upon receiving a DNS request, the first load balancer simply returns the virtual IP address of the second load balancer. This method of load balancing is disadvantageous in that it can only be employed in response to DNS requests where there is no guarantee that the request will come to the first load balancer since the request does not come directly from the client, and where subsequent requests to intermediate DNS servers may result in a previously cached response being returned with a virtual IP address of a load balancer that is no longer available.

Where redundant server farms are situated in more than one geographical location, the geographical location of a client may be considered when determining the load balancer to which the client's requests should be routed, in addition to employing conventional load balancing techniques. However, routing client requests to the geographically nearest server, load balancer, or server farm might not necessarily provide the client with the best service if, for example, routing the request to a geographically more distant location would otherwise result in reduced latency, fewer hops, or provide more processing capacity at the server.

SUMMARY OF THE INVENTION

The present invention seeks to provide novel apparatus and methods for load balancing client requests among redundant network servers and server farms in different geographical locations which overcome the known disadvantages of the prior art as discussed above.

There is thus provided in accordance with a preferred embodiment of the present invention a method for load balancing requests on a network, the method including receiving a request from a requestor having a requestor network address at a first load balancer having a first load balancer network address, the request having a source address indicating the requestor network address and a destination address indicating the first load balancer network address, forwarding the request from the first load balancer to a second load balancer at a triangulation network address, the request source address indicating the requestor network address and the destination address indicating the triangulation network address, the triangulation network address being associated with the first load balancer network address, and sending a response from the second load balancer to the requester at the requestor network address, the response having a source address indicating the first load balancer network address associated with the triangulation network address and a destination address indicating the first requestor network address.

Further in accordance with a preferred embodiment of the present invention the method includes maintaining the association between the triangulation network address and the first load balancer network address at either of the load balancers.

Still her in accordance with a preferred embodiment of the present invention the method includes maintaining the association between the triangulation network address and the first load balancer network address at the second load balancer, and communicating the association to the first load balancer.

Additionally in accordance with a preferred embodiment of the present invention the method includes directing the request from the second load balancer to a server in communication with the second load balancer, composing the response at the server, and providing the response to the second load balancer.

There is also provided in accordance with a preferred embodiment of the present invention a method for load balancing requests on a network, the method including determining the network proximity of a requestor with respect to each of at least two load balancers, designating a closest one of the load balancers by ranking the load balancers by network proximity, and directing requests from the requestor to the closest load balancer.

Further in accordance with a preferred embodiment of the present invention the method includes directing requests from any source having a subnet that is the same as the subnet of the requester to the closest load balancer.

Still further in accordance with a preferred embodiment of the present invention the method includes monitoring the current load of each of the load balancers, and performing the directing step the current load of the closest load balancer is less than the curt load o every other of the load balancers.

Additionally in accordance with a preferred embodiment of the present invention the determining step includes periodically determining.

Moreover in accordance with a preferred embodiment of the present invention the determining step includes determining at at least one fixed time.

Further in accordance with a preferred embodiment of the present invention the determining step includes polling the requestor to yield at least two attributes selected from the group consisting of latency, relative TTL, and number of hops to requestor.

Still further in accordance with a preferred embodiment of the present invention the determining step includes polling the requestor using at least two polling methods selected from the group consisting of: pinging, sending a TCP ACK message to, the requestor's source address and port, sending a TCP ACK message to the requestor's source address and port 80, and sending a UDP request to a sufficiently high port number as to elicit an "ICMP port unreachable" reply.

Additionally in accordance with a preferred embodiment of the present invention the designating step includes designating a closest one of the load balancers by ranking the load balancers by network proximity and either of current load and available capacity.

There is also provided in accordance with a preferred embodiment of the present invention a method for determining network proximity, the method including sending from each of at least two servers a UDP request having a starting TTL value to a client at a sufficiently high port number as to elicit an "ICMP port unreachable" reply message to at least one determining one of the servers indicating the UDP request's TTL value on arrival at the client, determining a number of hops from each of the servers to the client by subtract the starting TTL value from the TTL value on arrival for each of the servers, and determining which of the servers has fewer hops of the client, and designating the server having fewer hops as being closer to the client than the other of the servers.

There is additionally provided in accordance with a preferred embodiment of the present invention a network load balancing system including a network, a first load balancer connected to the network and having a first load balancer network address, a second load balancer connected to the network and having a triangulation network address, the triangulation network address being associated with the first load balancer network address, and a requestor connected to the network and having a requestor network address, where the requestor is operative to send a request via the network to the first load balancer, the request having a source address indicating the requestor network address and a destination address indicating the first load balancer network address, the first load balancer is operative to forward the request to the second load balancer at the triangulation network address, the request source address indicating the requestor network address and the destination address indicating the triangulation network address, and the second load balancer is operative to send a response to the requestor at the requester network address, the response having a source address indicating the first load balancer network address associated with the triangulation network address and a destination address indicating the first requestor network address.

Further in accordance with a preferred embodiment of the present invention either of the load balancers is operative to maintain a table of the association between the triangulation network address and the first load balancer network address.

Still further in accordance with a preferred embodiment of the present invention the second load balancer is operative to maintain a table of the association between the triangulation network address and the first load bar network address and communicate the association to the first load balancer.

Additionally in accordance with a preferred embodiment of the present invention the system further includes a server in communication with the second load balancer, where the second load balancer is operative to direct the request from the second load balancer to the server, and the server is operative to compose the response and provide the response to the second load balancer.

There is also provided in accordance with a preferred embodiment of the present invention a network load balancing system including a network, at least two load balancers connected to the network, and a requestor connected to the network, where each of the at least two load balancers is operative to determine the network proximity of the requestor, and at least one of the load balancers is operative to designate a closest one of the load balancers by ranking the load balancers by network proximity and direct requests from either of the requester and a subnet of the requester to the closest load balancer.

Further in accordance with a preferred embodiment of the present invention the load balancers are operative to poll the requester to yield at least two attributes selected from the group consisting of latency, relative TTL, and number of hops to requester.

Still further in accordance with a preferred embodiment of the present invention the load balancers are operative to poll the requestor using at least two polling methods selected from the group consisting of: pinging, sending a TCP ACK message to the requestor's source address and port, sending a TCP ACK message to the requestor's source address and port 80, and sending a UDP request to a sufficiently high port number as to elicit an "ICMP port unreachable" reply.

Additionally in accordance with a preferred embodiment of the present invention at least one of the load balancers is operative to designate the closest one of the load balancers by ranking the load balancers by network proximity and either of current load and available capacity.

It is noted that throughout the specification and claims the term "network proximity" refers to the quality of the relationship between a client and a first server or server farm as compared with the relationship between the client and a second server or server farm when collectively considering multiple measurable factors such as latency, hops, and server processing capacity.

There is further provided in accordance with a preferred embodiment of the present invention a method for managing a computer network connected to the Internet through a plurality of routes or Internet Service Providers, includes the steps of: sending polling requests through a plurality of ISPs from a computer network to a remote server computer, receiving replies from the remote server computer corresponding to the polling requests, and measuring proximities of the remote server computer to the computer network based on the received replies.

Further in accordance with a preferred embodiment of the present invention, the plurality of ISPs assign respective IP addresses to the computer network, and the sending step designates a source IP address for each polling request corresponding to the ISP through which the polling request is sent.

Still further in accordance with a preferred embodiment of the present invention the polling requests may be TCP/IP requests, UDP requests, or ping requests.

Additionally in accordance with a preferred embodiment of the present invention, the measuring step measures proximities based on the number of hops undergone by the received replies in travelling from the remote server to the computer network. Preferably the measuring step measures proximities based on the latency, relative TTL, and number of hops of the received replies in travelling from the remote server to the computer network.

Additionally or alternatively the measuring step may measure proximities based on the number of hops undergone by the received replies in travelling a round trip from the computer network to the remote server and back to the computer network, based on the TTL of the received replies in travelling a round trip from the computer network to the remote server and back from the remote server to the computer network, based on the latency of,the received replies in travelling from the remote server to the computer network or based on the latency of the received replies in travelling a round trip from the computer network to the remote server and back from the remote server to the computer network.

Further in accordance with a preferred embodiment of the present invention the method for managing a computer network connected to the Internet through a plurality of network connection, such as different Internet Service Providers, may also include the steps of rating the plurality of ISPs based on the measured proximities, and entering the ratings in a proximity table within a table entry indexed by an address related to the remote server computer.

Preferably the rating step also determines the best three choices for ISPs based on the measured proximities.

Additionally or alternatively the address related to the remote server computer is a subnet IP address of the remote server computer.

There is also provided in accordance with yet another preferred embodiment of the present a method for managing a computer network connected to the Internet through a plurality of ISPs, includes the steps of: receiving a request from a client within a computer network directed to a remote server computer, looking up a table entry within a proximity table indexed by an address related to the remote server computer, the tables entries of the proximity table containing ratings for a plurality of ISPs, and selecting one of the plurality of ISPs through which to route the client request, based on the ratings within the table entry looked up in the proximity table.

Further in accordance with a preferred embodiment of the present invention, the related to the remote server is a subnet IP address of the remote server.

Still further in accordance with a preferred embodiment of the present invention, the table entries contain the best three choices for ISPs through which to route the client request, and wherein the selecting step selects the best ISP, from among the best three choices for ISPs, that is available and not overloaded.

Additionally in accordance with a preferred embodiment of the present invention, the selecting step determines whether or not an ISP is overloaded based upon a user-configurable load threshold. Furthermore, the selecting step may also select an ISP based on current load, in the event that all three of the best three choices for ISP are unavailable or overloaded.

Further in accordance with a preferred embodiment of the present invention the plurality of ISPs assign respective IP addresses to the computer network, and wherein the method further comprises the step of setting the source IP address of the client request corresponding to the selected ISP.

Moreover in accordance with a preferred embodiment of the present invention the method also includes the step of routing the client request through the selected ISP. Preferably the plurality of ISPs assign respective IP addresses to the computer network, and the routing step designates a source IP address for the client request corresponding to the selected ISP.

The computer network may further be a private network, visible externally through a network address translation. Preferably the method may also include the steps of receiving a response from the remote server directed to the source IP address designated for the client request, and translating the source IP address designated for the client address to the IP address for the client within the private network.

There is further provided in accordance with yet another preferred embodiment of the present invention a network management system for managing a computer network connected to the Internet through a plurality of ISPs, including a network controller sending polling requests through a plurality of ISPs from a computer network to a remote server computer, and receiving replies from the remote server computer corresponding to the polling requests, and a proximity analyzer measuring proximities of the remote server computer to the computer network based on the replies.

Further in accordance with a preferred embodiment of the present invention the plural of ISPs assign respective IP addresses to the computer network, and the network controller designates a source IP address for each polling request corresponding to the ISP through which the polling request is sent.

Furthermore the polling requests may be TCP/IP requests, UDP requests, or ping requests.

Additionally in accordance with a preferred embodiment of the present invention the proximity analyzer measures proximities based on the number of hops undergone by the received replies in traveling from the remote server to the computer network. The proximity analyzer may measure proximities based on the latency, relative TTL, and number of hops of the received replies in traveling from the remote server to the computer network.

Moreover in accordance with a preferred embodiment of the present invention the proximity analyzer rates the plurality of ISPs based on the measured proxies. The system may further include a data manager entering the ratings in a proximity table within a table entry indexed by an address related to the remote server computer. Preferably the proximity analyzer determines the best three choices for ISPs based on the measured proximities.

Additionally in accordance with a preferred embodiment of the present invention, the address related to the remote server computer is a subnet IP address of the remote server computer.

There is also provided in accordance with another preferred embodiment of the present invention, a network management system for managing a computer network connected to the Internet through a plurality of ISPs, including a network controller receiving a client request from within a computer network directed to a remote server computer, and selecting one of a plurality of ISPs through which to route the client request, and a data manager looking up a table entry within a proximity table indexed by an address related to the remote server computer, the tables entries of the proximity table containing ratings for a plurality of ISPs. The network controller may also select one of the plurality of ISP based on the rating within the table entry looked up in the proximity table.

Further in accordance with a preferred embodiment of the present invention the address related to the remote server is a subnet IP address of the remote server.

Still further in accordance with a preferred embodiment of the present invention, the table entries contain the best three choices for ISPs through which to route the client request, and the network controller selects the best ISP, from among the best three choices for ISPs, that is available and not overloaded. Preferably the network controller also determines whether or not an ISP is overloaded based upon a user-configurable load threshold.

Additionally in accordance with a preferred embodiment of the present invention, the network controller selects an ISP based on current load, in the event that all three of the best three choices for ISP are unavailable or overloaded The plurality of ISPs may assign respective IP addresses to the computer network, the network controller designates a source IP address for the client request corresponding to the selected ISP.

Moreover in accordance with a preferred embodiment of the present invention, the network controller routes the client request through the selected ISP. Preferably the computer network is a private network, visible externally through a network address translation, and the network controller receives a response from the remote server directed to the source IP address designated for the client request, the system further comprising a network address translator translating the source IP address designated for the client address to the IP address for the client within the private network.

There is also provided in accordance with yet another preferred embodiment of the present invention a method for managing a computer network connected to the Internet through a plurality of ISPs, including the steps of receiving a DNS resolution query from a remote computer for a domain name within a computer network, sending polling requests through a plurality of ISPs from the computer network to the remote computer, receiving replies from the remote computer corresponding to the polling requests, and measuring proximities of the remote computer to the computer network based on the replies.

Further in accordance with a preferred embodiment of the present invention the plurality of ISPs assign respective IP addresses to the computer network, and the sending step designates a source IP address for each polling request corresponding to the ISP through which the polling request is sent.

Still further in accordance with a preferred embodiment of the present invention the polling requests may be TCP/IP requests, UDP requests, or ping requests.

Additionally in accordance with a preferred embodiment of the present invention, the measuring step measures proximities based on the number of hops undergone by the received replies in travelling from the remote server to the computer network.

Further in accordance with a preferred embodiment of the present invention the proximity analyzer measures proximities based on the number of hops undergone by the received replies in traveling a round trip from the computer network to the remote server and back to the computer network.

Alternatively the proximity analyzer measures proximities based on the TTL of the received replies in travelling a round trip from the computer network to the remote server and back to the computer network, on the latency of the received replies in travelling from the remote server to the computer network, or on the latency of the received replies in travelling a round trip from the computer network to the remote server and back to the computer network.

Moreover in accordance with a preferred embodiment of the present invention, the measuring step may also measure proximities based on the latency, relative TTL, and number of hops of the received replies in travelling from the remote server to the computer network.

The method may further include the steps of: rating the plurality of ISPs based on the measured proximities, and entering the ratings in a proximity table within a table entry indexed by an address related to the remote server computer. Preferably the rating step determines the best three choices for ISPs based on the measured proximities.

Additionally or alternatively the address related to the remote server computer is a subnet IP address of the remote server computer.

There is further provided in accordance with yet another preferred embodiment of the present invention a method for managing a computer network connected to the Internet through a plurality of ISPs, which includes the steps of: receiving a DNS resolution query from a remote computer for a domain name within a computer network, looking up a table entry within a proximity table indexed by an address related to the remote computer, the tables entries of the proximity table containing ratings for a plurality of ISPs, selecting one of the plurality of ISPs, based on the ratings within the table entry looked up in the proximity table, and responding to the DNS resolution query with an IP address associated with the selected one of the plurality of ISPs.

Further in accordance with a preferred embodiment of the present invention the address related to the remote computer is a subnet IP address of the remote computer.

Still further in accordance with a preferred embodiment of the present invention the table entries contain the best three choices for ISPs through which to connect to the remote computer from within the computer network, and the selecting step selects the best ISP, from among the best three choices for ISPs, that is available and not overloaded. Preferably the selecting step determines whether or not an ISP is overloaded based upon a user-configurable load threshold.

Additionally in accordance with a preferred embodiment of the present invention, the selecting step selects an ISP based on current load, in the event that all three of the best three choices for ISP are unavailable or overloaded.

Further in accordance with a preferred embodiment of the present invention the plurality of ISPs assign respective IP addresses to the computer network and wherein said network controller sets the source IP address of the client request corresponding to the selected ISP.

Moreover in accordance with a preferred embodiment of the present invention, the plurality of ISPs assign respective IP addresses to the computer network, and the responding step designates an IP address corresponding to the selected ISP. Preferably the computer network is a private network, visible externally through a network address translation.

Still further in accordance with a preferred embodiment of the present invention the responding step designates an IP address of an internal server that supports the domain name in the DNS query.

The method may further include the steps of: receiving a request having a destination IP address corresponding to the selected ISP, and translating the destination IP address to an IP address within the private network.

There is also provided in accordance with yet another preferred embodiment of the present invention a network management system for managing a computer network connected to the Internet through a plurality of ISPs, including a network controller receiving a DNS resolution query from a remote computer for a domain name within a computer network, sending polling requests through a plurality of ISPs from the computer network to the remote computer, and receiving replies from the remote computer corresponding to the polling requests, and a proximity analyzer measuring proximities of the remote computer to the computer network via the plurality of ISPs, based on the replies.

Further in accordance with a preferred embodiment of the present invention, the plurality of ISPs assign respective IP addresses to the computer network, and the network controller designates a source IP address ISP each polling request corresponding to the ISP through which the polling request is sent.

Still further in accordance with a preferred embodiment of the present invention, the polling requests are TCP/IP requests, UDP requests, or ping requests.

Additionally in accordance with a preferred embodiment of the present invention the proximity analyzer measures proximities based on the number of hops undergone by the received replies in travelling from the remote server to the computer network.

Moreover in accordance with a preferred embodiment of the present invention, the proximity analyzer measures proximities based on the latency, relative TTL, and number of hops of the received replies in travelling from the remote server to the computer network.

Still further in accordance with a preferred embodiment of the present invention, the proximity analyzer rates the plurality of ISPs based on the measured proximities, and enters the ratings in a proximity table within a table entry indexed by an address related to the remote server computer. Preferably the proximity analyzer determines the best three choices for ISPs based on the measured proximities.

Additionally in accordance with a preferred embodiment of the present invention, the address related to the remote server computer is a subnet IP address of the remote server computer.

There is further provided in accordance with yet another preferred embodiment of the present invention, a network management system for managing a computer network connected to the Internet through a plurality of ISPs, including a network controller receiving a DNS resolution query from a remote computer for a domain name within a computer network, selecting one of a plurality of ISPs, and responding to the DNS resolution query with an IP address associated with the selected ISP, and a data manager looking up a table entry within a proximity table indexed by an address related to the remote computer, the tables entries of the proximity table containing ratings for the plurality of ISPs. The network controller may also select an ISP based on ratings within the table entry looked up in the proximity table.

Further in accordance with a preferred embodiment of the present invention, the address related to the remote computer is a subnet IP address of the remote computer.

Still further in accordance with a preferred embodiment of the present invention, the table entries contain the best three choices for ISPs through which to connect to the remote computer from within the computer network, and the network controller selects the best ISP, from among the best three choices for ISPs, that is available and not overloaded. Preferably, the network controller determines whether or not an ISP is overloaded based upon a user-configurable load threshold.

Additionally in accordance with a preferred embodiment of the present invention the network controller selects an ISP based on current load, in the event that all three of the best three choices for ISP are unavailable or overloaded.

Moreover in accordance with a preferred embodiment of the present invention, the plurality of ISPs assign respective IP addresses to the computer network, and wherein said network controller designates an IP address corresponding to the selected ISP. Preferably the computer network is a private network, visible externally through a network address translation.

Still further in accordance with a preferred embodiment of the present invention the network controller designates an IP address of an internal server that supports the domain name in the DNS query.

Additionally or alternatively the network controller receives a request having a destination IP address corresponding to the selected ISP; the system further comprising a network address translator translating the destination IP address to an IP address within the private network.

There is thus provided in accordance with yet another preferred embodiment of the present invention a routing system for routing data via a network from a first node to a second node, and wherein the network having a plurality of available routes from the first node to the second node, and the system also includes a route selector operable to select one of the routes for sending data between the first node and second node on the basis of content information of the data, an obtained quality level of the routes and proximity information.

There is further provided in accordance with a further preferred embodiment of the present invention a routing system for routing data via a network from a of node to a second node, and wherein the network having a plurality of available routes from the first node to the second node, and the system also includes a route selector operable to select one of the routes for sending data between the first node and second node on the basis of costing information of said routes.

Further in accordance with a preferred embodiment of the present invention the route selector is operable to select one of the routes for sending data between the first node and second node additionally on the basis of costing information of the routes.

Still further in accordance with a preferred embodiment of the present invention the route selector is operable to perform optimization between content information of the data and costing information of the routes, to select a route.

Additionally in accordance with a preferred embodiment of the present invention the route selector is operable to perform optimization additionally on the basis of delay time of the connection, to select a route.

Moreover in accordance with a preferred embodiment of the present invention the route selector is operable to perform optimization additionally on the basis of path quality, to select a route.

Additionally in accordance with a preferred embodiment of the present invention the route selector is operable to perform optimization additionally on the basis of traffic load, to select a route.

Still further in accordance with a preferred embodiment of the present invention the route selector is operable to perform optimization additionally on the basis of delay time of the connection.

Furthermore, a Destinations Table is built to summarize the connection data for each one of a plurality of possible destination nodes. The Destinations Table is built based on previously determined proximities.

Additionally the route selector is operable to configure and use a Decision Parameter Table comprising parameters of the routes. Furthermore, different Decision Parameters are supplied for each respective content type. The Decision Parameter Table also includes at least one of a group of parameter weights comprising; Data packet content; Hops weighting factor, Packet loss factor and Response time factor. It is appreciated that a different Decision Parameters is used for each respective content.

A Decision Function $F_{content}$ is calculated for each path from the first node to the second node, based on said Decision Parameter Table. The Decision Function $F_{content}$ is defined as:

$F_{content}$=F(Hops weighting factor*Hops count factor; Response weighting factor*Response time factor; Path quality weighting factor*Path quality factor, Packet loss weighting factor*Packet loss factor).

All factors and weights are taken from the Destination Table and the Decision Parameter Table, respectively.

Still further in accordance with a preferred embodiment of the present invention, the above parameters, which are used in the calculation of $F_{content}$, are normalized for each path.

Still further in accordance with a preferred embodiment of the present invention, all previously defined factors are normalized for each path between the first node and the second node. Preferably the route selector is operable to decide on the path for routing the data packet from the first node to said second node based on said Decision Function.

The network connection may be for the Internet or for different ISPs.

There is further provided in accordance with yet another preferred embodiment of the present invention a method for routing data by a content routing system from a first node to a second node via a network and including the steps of providing a plurality of available routes from the first node to the second node and selecting one of the routes for sending data between the first node and second node on the basis of content information of the data.

There is also provided in accordance with yet another preferred embodiment of the present invention a method for routing data by a content routing system from,a first node to a second node via a network and including the steps of providing a plurality of available routes from the first node to the second node and a route selector selecting one of the routes for sending data between the first node and second node on the basis of costing information of the routes.

Further in accordance with a preferred embodiment of the present invention the method includes selecting one of the routes for sending data between the first node and second node on the basis of costing information of the routes.

Still further in accordance with a preferred embodiment of the present invention the method further includes the step of performing optimization between content information of the data and costing information of the routes.

Moreover in accordance with a preferred embodiment of the present invention, including the step of performing optimization additional on the basis of delay time of the connection or on the basis of path quality of the connection, or on the basis of packet loss of the path, or on a combination of any of these parameters. Further in accordance with a preferred embodiment of the present invention the available routes possess a path quality factor $Q_i$. The path quality factor $Q_i$ is defined as being a function of the traffic load, packet loss, and link pricing. Additionally, the path quality factor Qis dependent on the content of the data packet.

Still further in accordance with a preferred embodiment of the present invention the path quality factor $Q_i$ is checked periodically.

There is further provided in accordance with a preferred embodiment of the present invention a method for calculating a path quality parameter for a network path between a first node and a second node, including the step of checking the availability of the path, the cost of the path connection, and the data packet loss rate of the path.

BRIEF DESCRIPTION OF THE DRAWINGS

The present invention will be understood and appreciated from the following detailed description, taken in conjunction with the drawings in which:

FIGS. 1A–1C, taken together, are simplified pictorial flow illustrations of a triangulation load balancing system constructed and operative in accordance with a preferred embodiment of the present invention;

FIGS. 2A–2F, taken together, are simplified pictorial flow illustrations of a network proximity load balancing system constructed and operative in accordance with another preferred embodiment of the present invention;

FIGS. 3A–3F, taken together, are simplified pictorial flow illustrations of a preferred embodiment of the present invention for managing and load balancing a multi-homed network architecture whereby a client is connected to the Internet through multiple ISPs.

FIG. 7 illustrates a typical Destination Table which is compiled by the content router for each router and its respective path in accordance with another preferred embodiment of the present invention.

DETAILED DESCRIPTION OF PREFERRED EMBODIMENTS

Figure 1C:
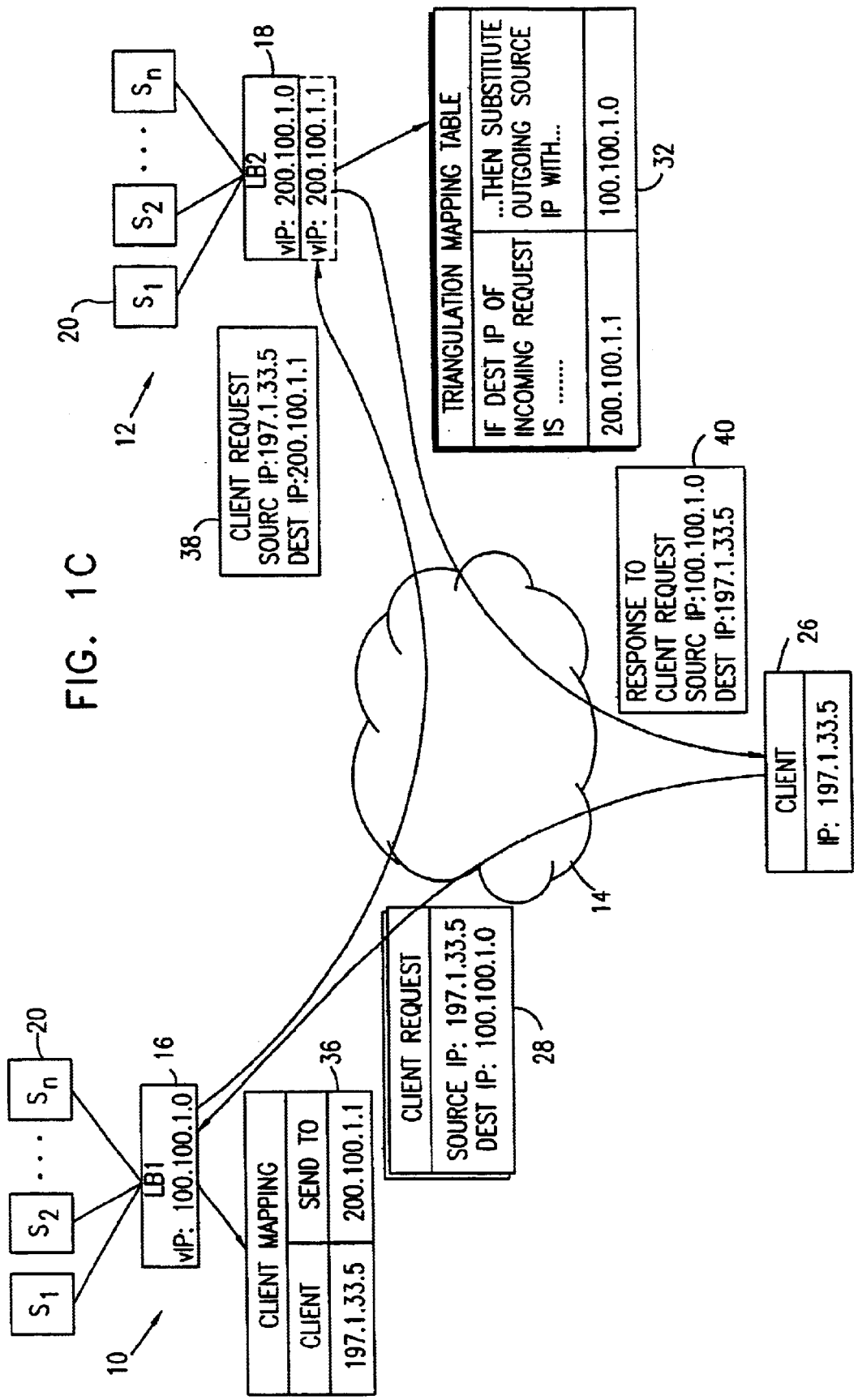

Reference is now made to FIGS. 1A–1C which, taken together, are simplified pictorial flow illustrations of a triangulation load balancing system constructed and operative in accordance with a preferred embodiment of the present invention. Two server farms, generally designated 10 and 12 respectively, are shown connected to a network 14, such as the Internet, although it is appreciated that more than two server farms may be provided. Server farms 10 and 12 typically comprise a load balancer 16 and 18 respectively, which may be a dedicated load balancer or a server or router configured to operate as a load balancer, with each of the load balancers being connected to one or more servers 20. Load balancers 16 and 18 are alternatively referred to herein as LB1 and LB2 respectively. LB1 and LB2 typically maintain a server status table 22 and 24 respectively, indicating the current load, configuration, availability, and other server information as is common to load balancers. LB1 and LB2 also typically periodically receive and maintain each other's overall status and load statistics such that LB1 and LB2 can know each other's availability.

Typical operation of the triangulation load balancing system of FIGS. 1A–1C is now described by way of example. As is shown more particularly with reference to FIG. 1A, a client 26, such as any known computer terminal configured for communication via network 14, is shown sending a request 28, such as an FTP or HTTP request, to LB1 whose virtual IP address is 100.100.1.0. In accordance with network transmission protocols, request 28 indicates the source IP address of the requestor, being the IP address 197.1.33.5 of client 26, and the destination IP address, being the virtual IP address 100.100.1.0 of LB1. LB2 preferably periodically sends a status report 30 to LB1, the virtual IP address 100.100.1.0 of LB1 being known in advance to LB2. Status report 30 typically indicates the availability of server farm 12 and provides load statistics, which LB1 maintains.

LB2 is preferably capable of having multiple virtual IP addresses as is well known. It is a particular feature of the present invention for LB2 to designate a currently unused virtual IP address, such as 200.100.1.1, for LB1's use and store the mapping between the IP address of LB1 and the designated IP address in a triangulation mapping table 32, as is shown more particularly with reference to FIG. 1B. The designated address is referred to herein as the triangulation address and may be preconfigured with LB1 or periodically provided to LB1 from LB2. LB1 preferably maintains in a client mapping table 36 a mapping of the IP address 197.1.33.5 of client 26 and the triangulation address 200.100.1.1 of LB2 to which client 26's requests may be redirected.

As shown in the example of FIG. 1A, server status table 22 of LB1 indicates that no servers in server farm 10 are available to service client 26's request, but indicates that server farm 12 is available. Having decided that client 26's request should be forwarded to LB2, in FIG. 1C LB1 substitutes the destination IP address of request 28 with the virtual IP address 200.100.1.1 of LB2 which is now mapped to the IP address of client 26 as per client mapping table 36 and sends an address-modified client request 38 to LB2. LB2, upon receiving request 38 at its virtual IP address 200.100.1.1, checks triangulation mapping table 32 and finds that virtual IP address 200.100.1.1 has been designated for LB1's use. LB2 therefore uses the virtual IP address 100.100.1.0 of LB1 as per triangulation mapping table 32 as the source IP address of an outgoing response 40 that LB2 sends to client 26 after the request has been serviced by one of the servers in server arm 12 selected by LB2. It is appreciated that response 40 must appear to client 26 to come from LB1, otherwise client 26 will simply ignore response 40 as an unsolicited packet. Client 26 may continue to send requests to LB1 which LB1 then forwards requests to LB2 at the designated triangulation address. LB2 directs requests to an available server and sends responses to client 26 indicating LB1 as the source IP address.

Reference is now made to FIGS. 2A–2F which, taken together, are simplified pictorial flow illustrations of a network proximity load balancing system constructed and operative in accordance with another preferred embodiment of the present invention. The configuration of the system of FIGS. 2A–2F is substantially similar to FIGS. 1A–1C except as otherwise described hereinbelow. For illustration purposes, a third server farm, generally designated 50, is shown connected to network 14, although it is appreciated that two or more server farms may be provided. Server farm 50 typically comprises a load balancer 52, which may be a dedicated load balancer or a server or router configured to operate as a load balancer, with load balancer 52 being connected to two or more servers 20. Load balancer 52 is alternatively referred to herein as LB3.

Typical operation of the network proximity load balancing system of FIGS. 2A–2F is now described by way of example. As is shown more particularly with reference to FIG. 2A, client 26 is shown sending request 28, such as an FTP or HTTP request to LB1 whose virtual IP address is 100.100.1.0. LB1 preferably maintains a proximity table 54 indicating subnets and the best server farm site or sites to which requests from a particular subnet should be routed. Determining the "best" site is described in greater detail hereinbelow.

Upon receiving a request, LB1 may decide to service the request or not based on normal load balancing considerations. In any case, LB1 may check proximity table 54 for an entry indicating the subnet corresponding to the subnet of the source IP address of the incoming request. As is shown more particularly with reference to FIG. 2B, if no corresponding entry is found in proximity table 54, LB1 may send a proximity request 56 to LB2, and LB3, whose virtual IP addresses are known in advance to LB1. Proximity request 56 indicates the IP address of client 26.

A "network proximity" may be determined for a requester such as client 26 with respect to each load balancer/server farm by measuring and collectively considering various attributes of the relationship such as latency, hops between client 26 and each server farm, and the processing capacity and quality of each server farm site. To determine comparative network proximity, LB1, LB2, and LB3 preferably each send a polling request 58 to client 26 using known polling mechanisms. While known polling mechanisms included pinging client 26, sending a TCP ACK message to client 26 may be used where pinging would otherwise fail due to an intervening firewall or NAT device filtering out a polling message. A TCP ACK may be sent to the client's source IP address and port. If the client's request was via a UDP connection, a TCP ACK to the client's source IP address and port 80 may be used. One or both TCP ACK messages should bypass any intervening NAT or firewall and cause client 26 to send a TCP RST message, which may be used to determine both latency and TTL. While TTL does not necessarily indicate the number of hops from the client to the load balancer, comparing TTL values from LB1, LB2, and LB3 should indicate whether it took relatively more or less hops.

Another polling method involves sending a UDP request to a relatively high port number at the client, such as 2090. This request would typically be answered: with an "ICMP port. unreachable" reply which would indicate the TTL value of the UDP request on arrival at the client. Since the starting TTL value of each outgoing UDP request is known, the actual number of hops to the client may be determined by subtracting the TTL value on arrival at the client from the starting TTL value. A combination of pinging, TCP ACK, UDP, TCP SYN, and other polling techniques may be used since any one polling request might fail.

Figure 2A:
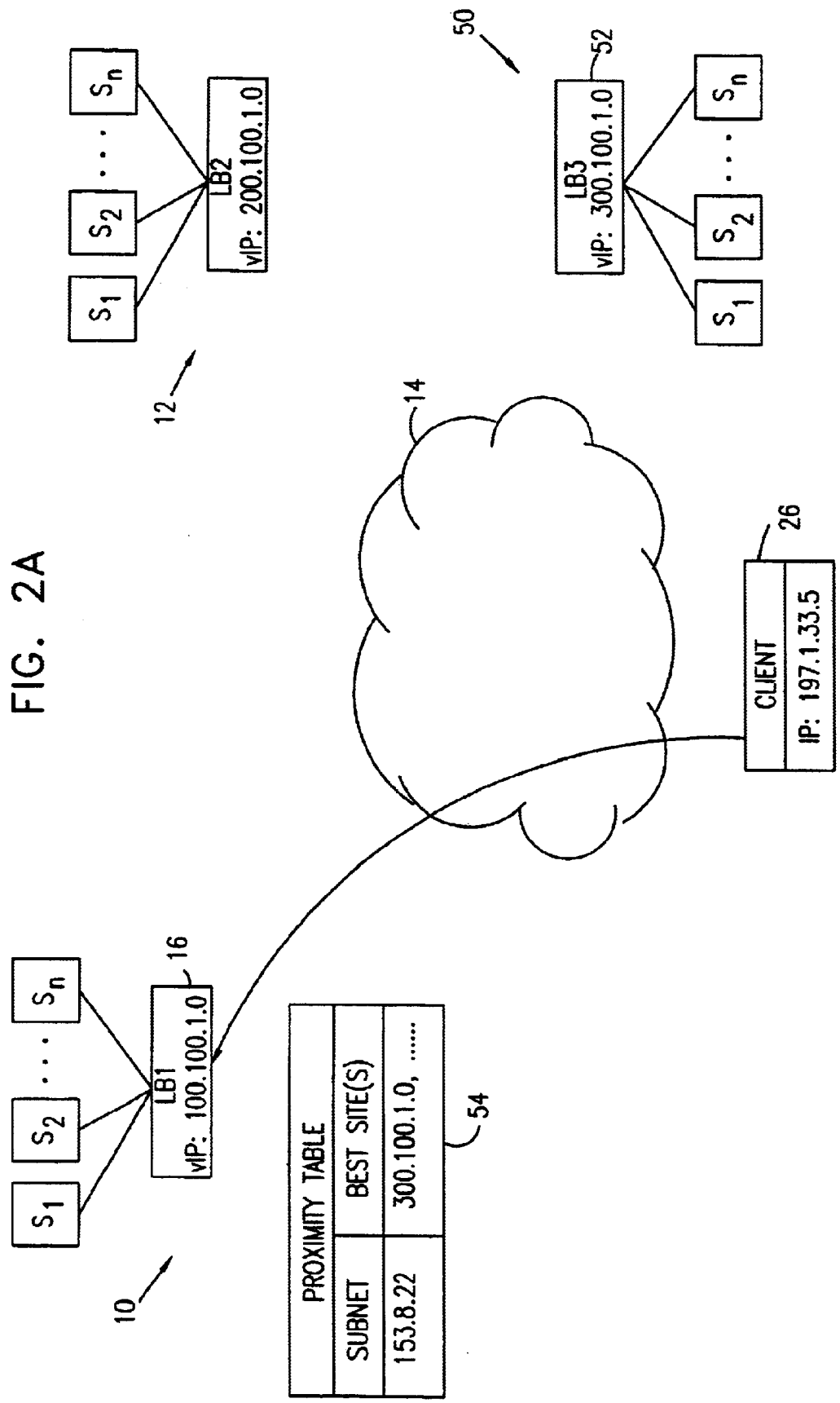
Figure 2B:
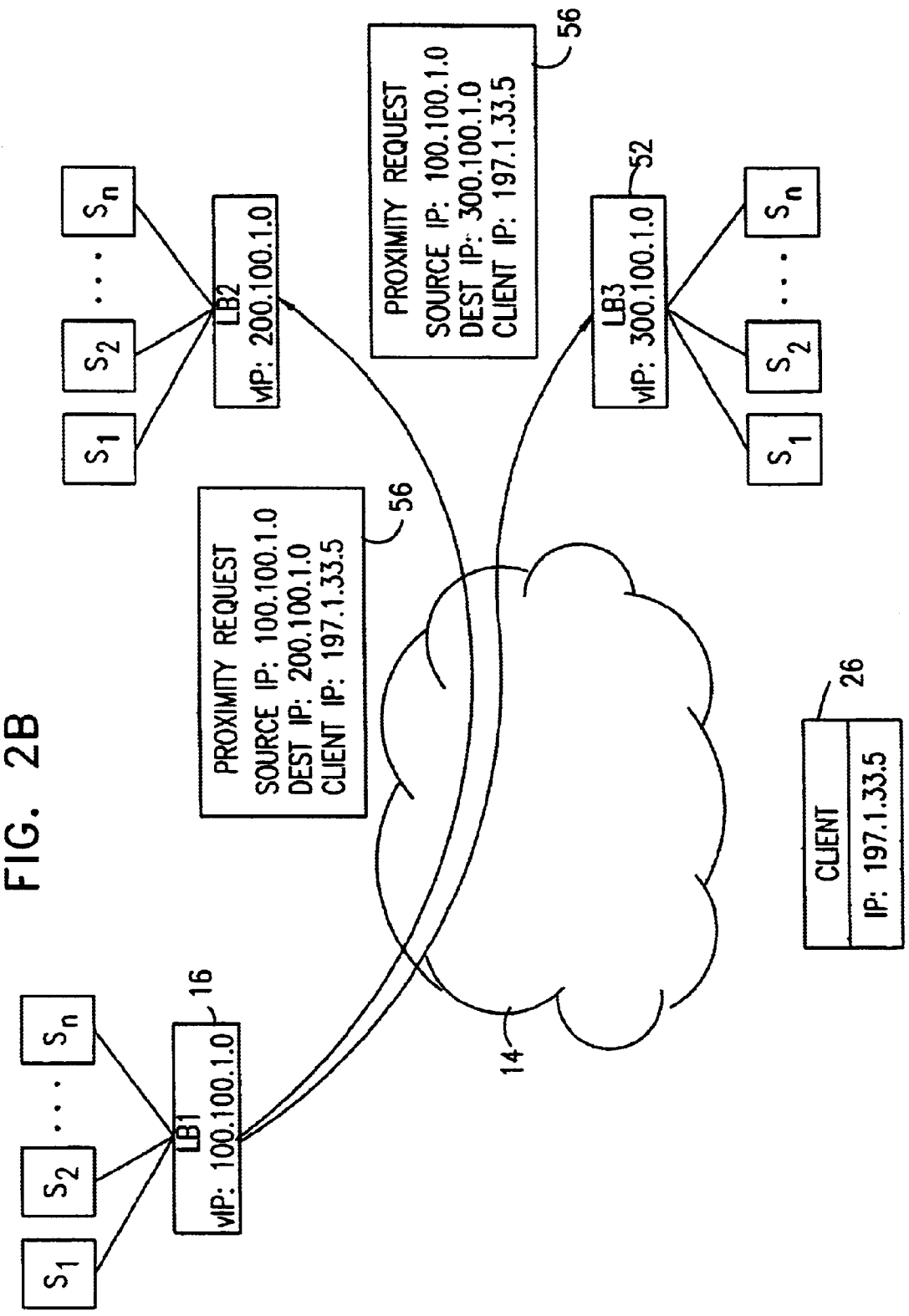
Figure 2D:
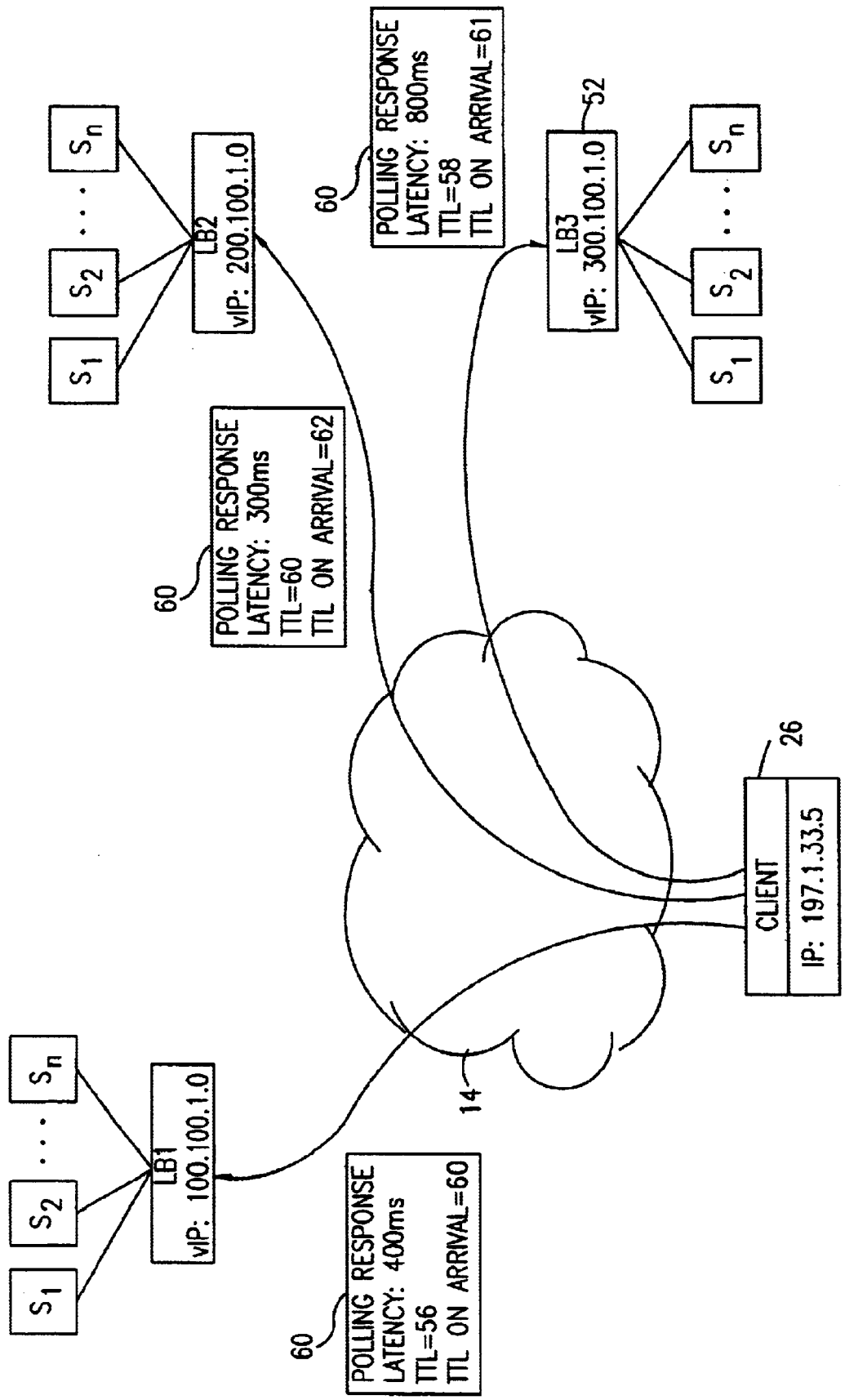
Figure 2E:
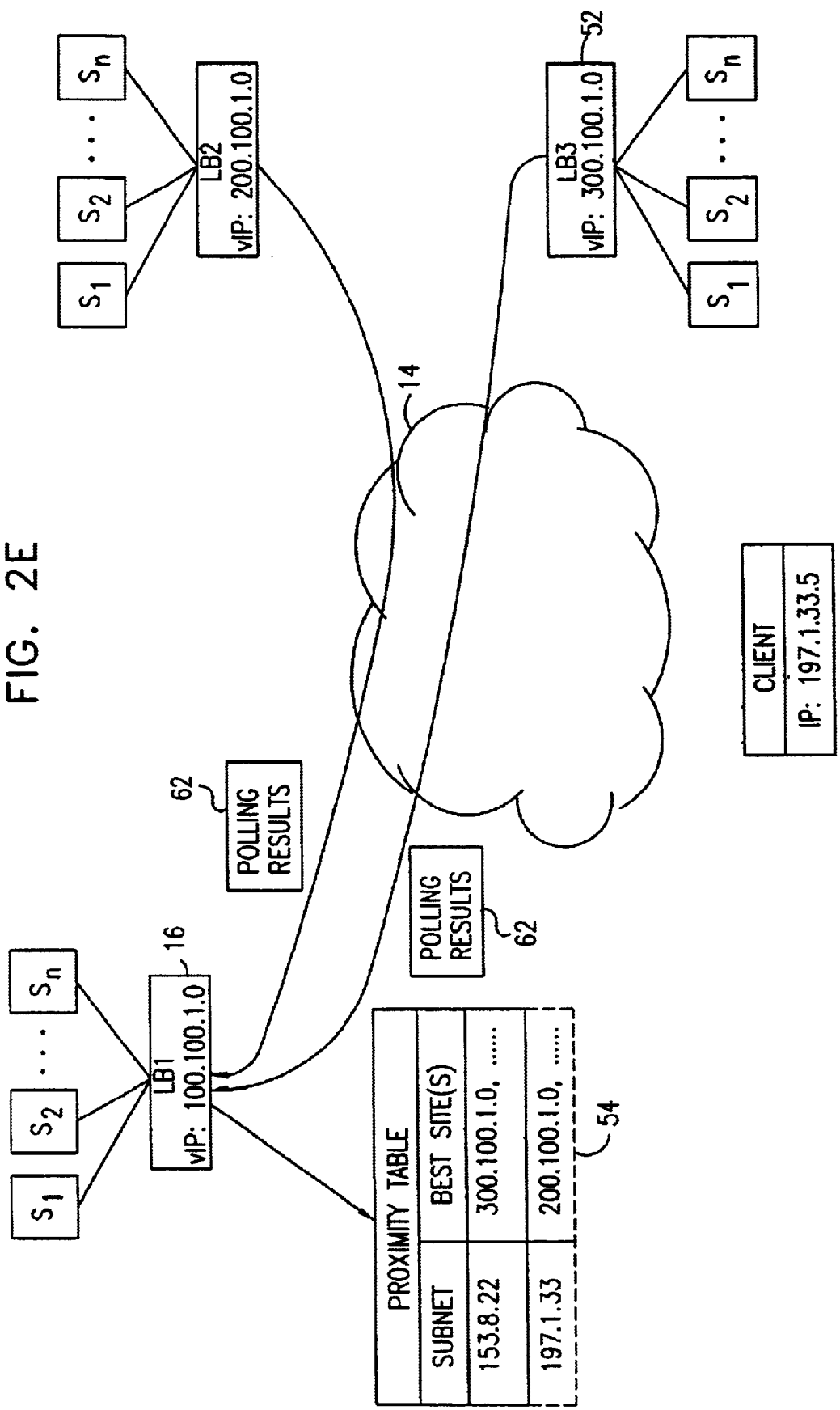

Client 26 is shown in FIG. 2D sending a polling response 60 to the various polling requests. The responses may be used to determine the latency of the transmission, as well as the TTL value. LB2 and LB3 then send polling results 62 to LB1, as shown in FIG. 2E. The polling results may then be compared, and LB1, LB2, and LB3 ranked, such as by weighting each attribute and determining a total weighted value for each server farm. Polling results may be considered together with server farm capacity and availability, such as may be requested and provided using known load balancing reporting techniques or as described hereinabove with reference to FIGS. 1A and 1B, to determine the server farm site that is "closest" to client 26 and, by extension, the client's subnet, which, in the example shown, is determined to be LB2. For example, the closest site may be that which has the lowest total weighted value for all polling, load, and capacity results. LB1 may then store the closest site to the client/subnet in proximity table 54.

As was described above, a load balancer that receives a request from a client may check proximity table 54 for an entry indicating the subnet corresponding to the subnet of the source IP address of the incoming request. Thus, if a corresponding entry is found in proximity table 54, the request is simply routed to the location having the best network proximity. Although the location having the best network proximity to a particular subnet may have already been determined, the load balancer may nevertheless decide to forward an incoming request to a location that does not have the best network proximity should a load report received from the best location indicate that the location is too busy to receive requests. In addition, the best network proximity to a particular subnet may be periodically redetermined, such as at fixed times or after a predetermined amount of time has elapsed from the time the last determination was made.

As is shown more particularly with reference to FIG. 2F, once the closest site for client 26 has been determined, client 26 may be redirected to the closest site using various methods. If a DNS request is received from client 26, LB1 may respond with LB2's address. If an HTTP request is received from client 26, HTTP redirection may be used. Alternatively, regardless of the type of request received from client 26, triangulation as described hereinabove with reference to FIGS. 1A–1C may be used.

The present invention can also be used in a multi-homing environment; i.e., for management of networks that have multiple connections to the Internet through multiple Internet Service Providers (ISPs).

Figure 3A:
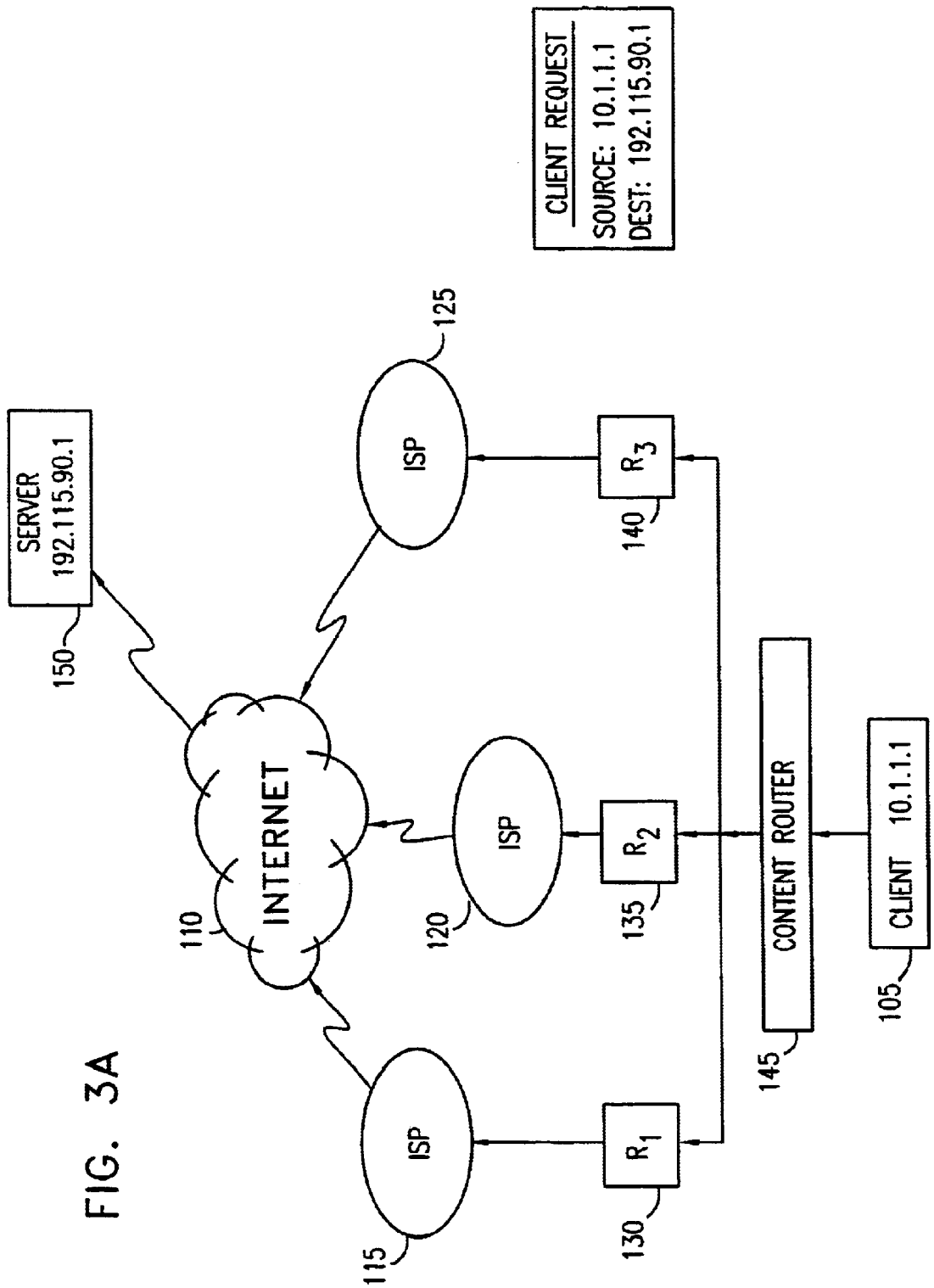

Reference is now made to FIGS. 3A–3F, which illustrate a preferred embodiment of the present invention for managing and load balancing a multi-homed network architecture whereby a client is connected to the Internet through multiple ISPs. As illustrated in FIG. 3A, a client 105 is connected to the Internet 110 through three ISPs, 115, 120 and 125, each having a respective router 130, 135 and 140 to controls the flow of data packets. The system includes a content router 145, operative in accordance with a preferred embodiment of the present invention, to provide efficient connectivity between client 105 and Internet servers, such as server 150. As illustrated in FIG. 3A, client 105 has an IP address of 10.1.1.1 on a private network, and seeks to connect to server 150 having an IP address of 192.115.90.1.

Figure 3B:
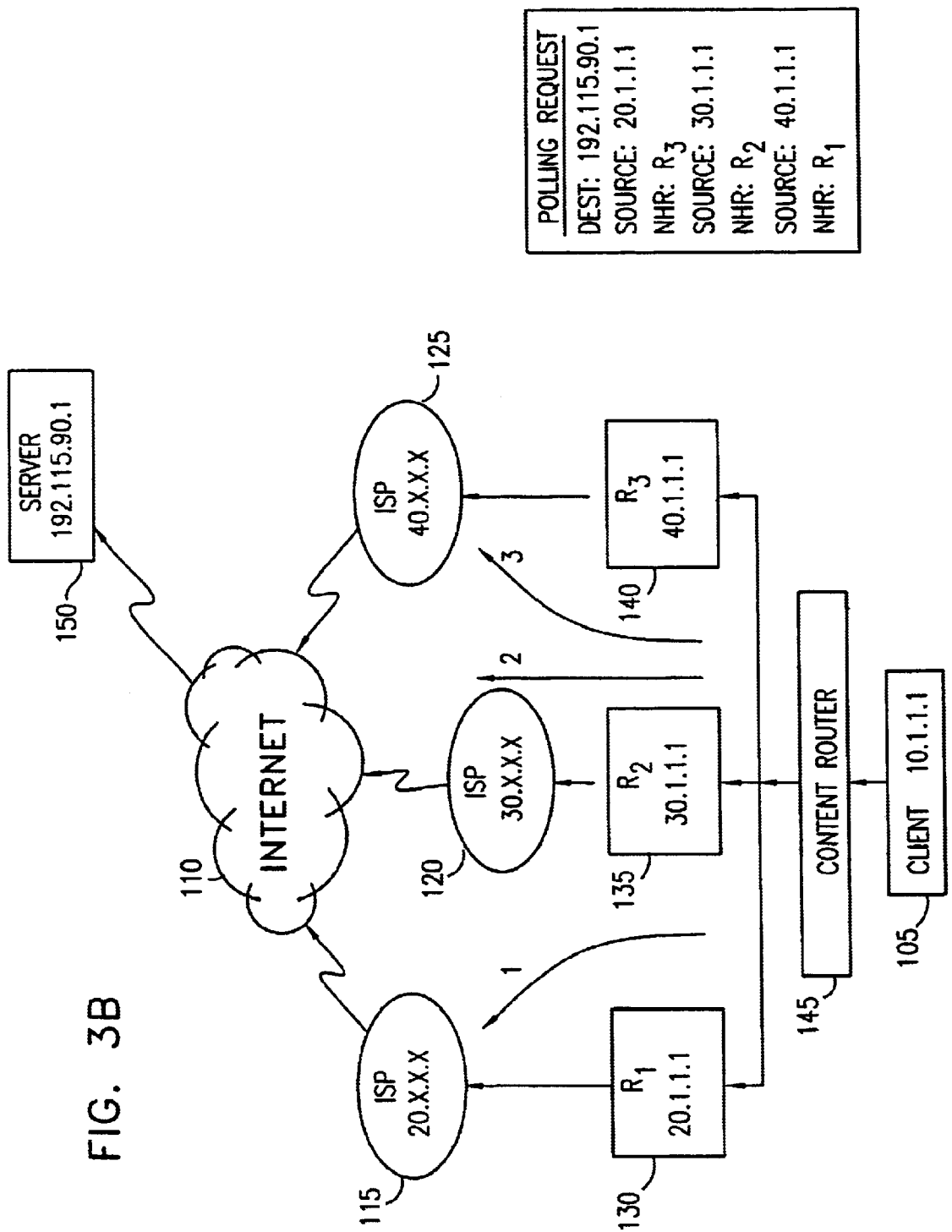

As illustrated in FIG. 3B, ISPs 115, 120 and 125 assign respective IP address ranges to the client network, indicated in FIG. 3B by ranges 20.x.x.x, 30.x.x.x and 40.x.x.x. The first time that client 105 connects to server 150, content router 145 preferably sends polling requests through each of routers 130, 135 and 140 in order to determine the proximity of server 150 to client 105. When sending the polling requests, content router 145 assigns respective network addresses 20.1.1.1, 30.1.1.1 and 40.1.1.1 to client 105. Thus three polling requests are sent: one from each of the sources 20.1.1.1, 30.1.1.1 and 40.1.1.1 to destination 192.115.90.1.

Figure 3C:
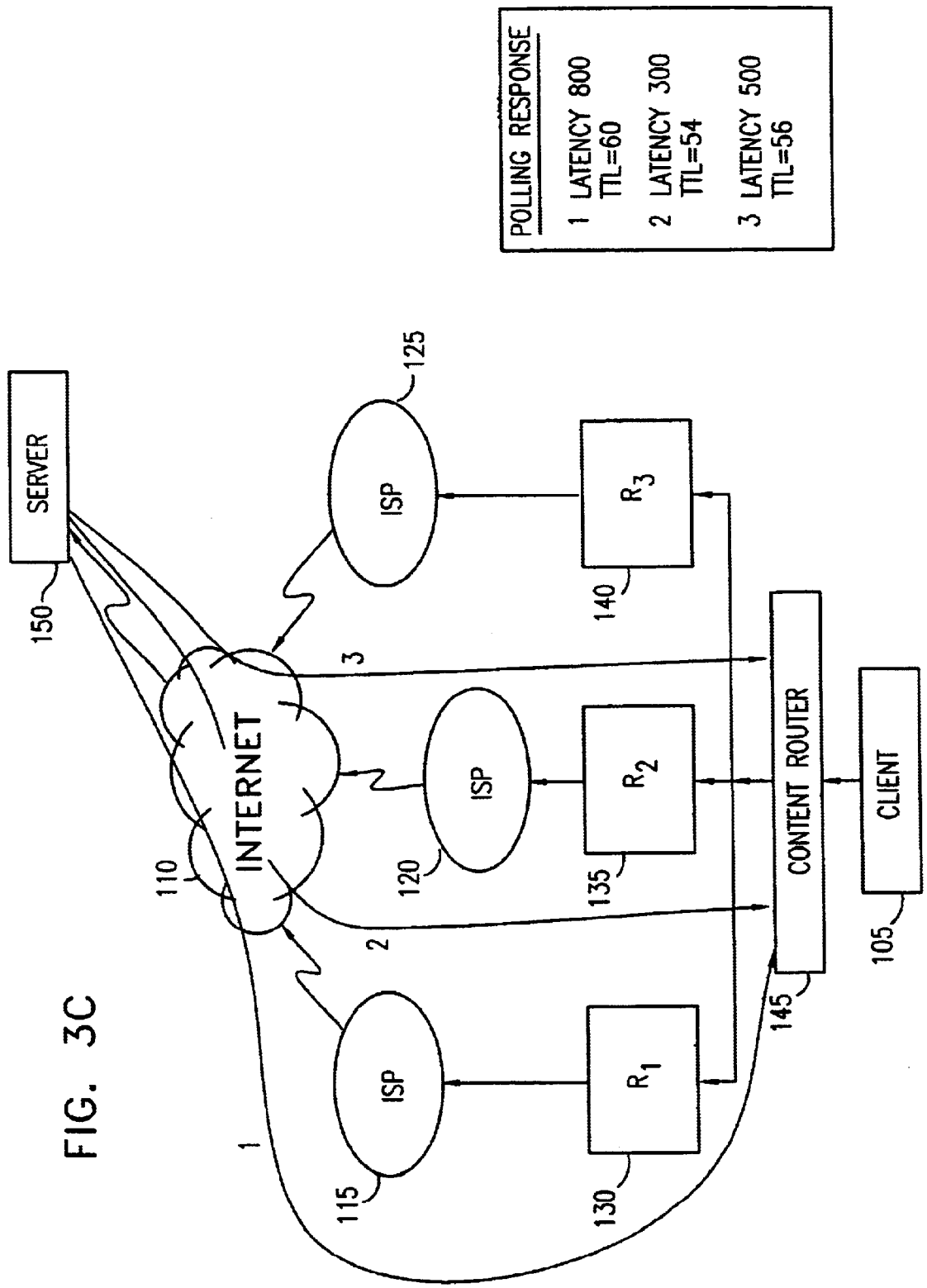

As illustrated in FIG. 3C, server 150 replies to each network address 20.1.1.1, 30.1.1.1 and 40.1.1.1, and the replies are accordingly transmitted through each of the respective ISPs 115, 120 and 125. Each of the replies is measured for latency and number of hops. For example, as illustrated in FIG. 3C, the three replies respective have latency and TTL metrics of 800/60; 300/54; and 500/56.

Figure 3D:
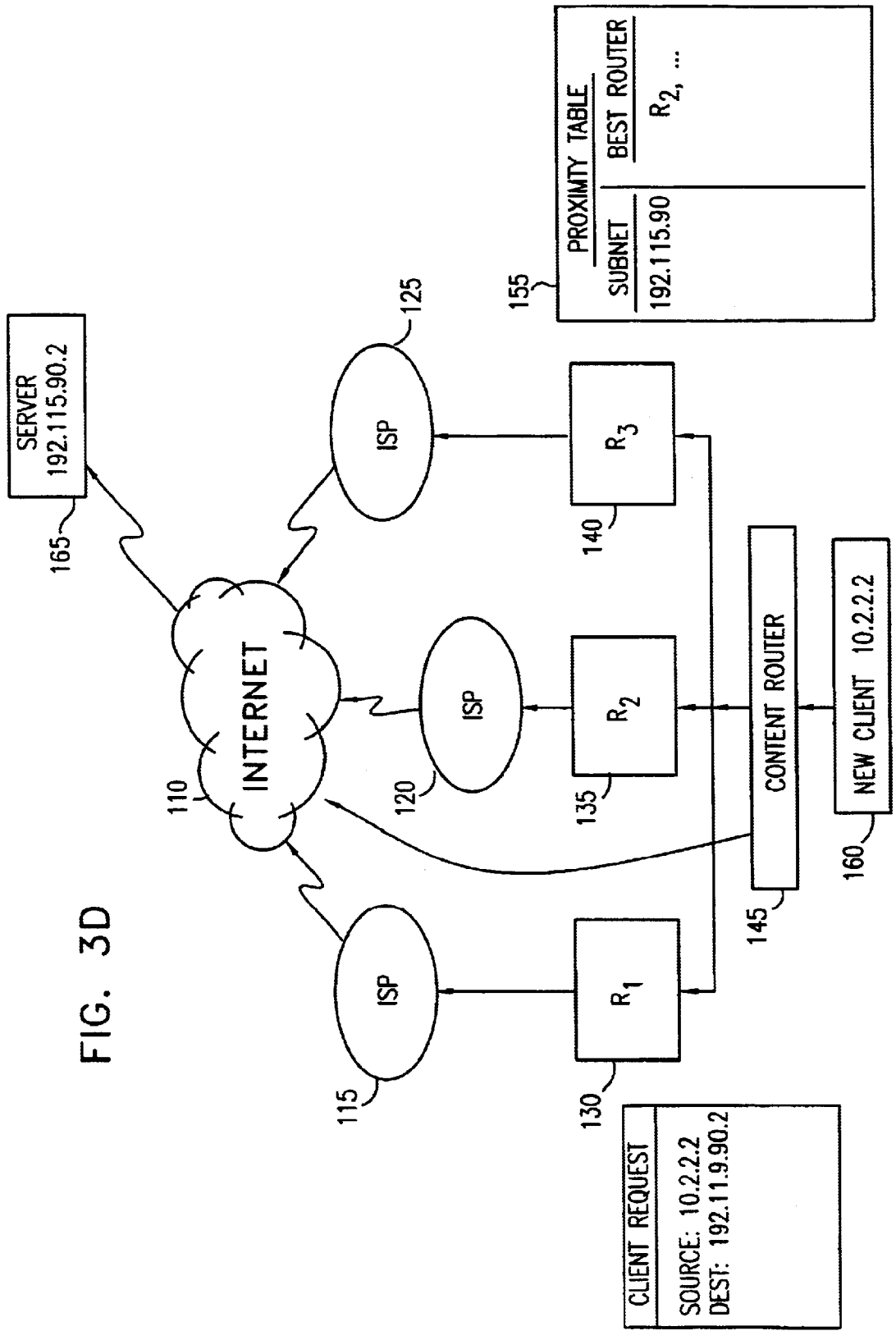

Based on these polling results, content router 145 chooses, for example, router 135 as its first choice for connecting client 105 with server 150. As illustrated in FIG. 3D, proximity results are stored in a proximity table 155. Specifically, proximity table 155 indicates that router 135 is the first choice for connecting content router 145 to any computer residing on subset 192.115.90. Thus, when a new client 160 with IP address 10.2.2.2 on the private network attempts to connect to a server 165 with IP address 192.115.90.2, through a content router 145, content router 145 determines from proximity table 155 that the best router to use is router 135.

Figure 3E:
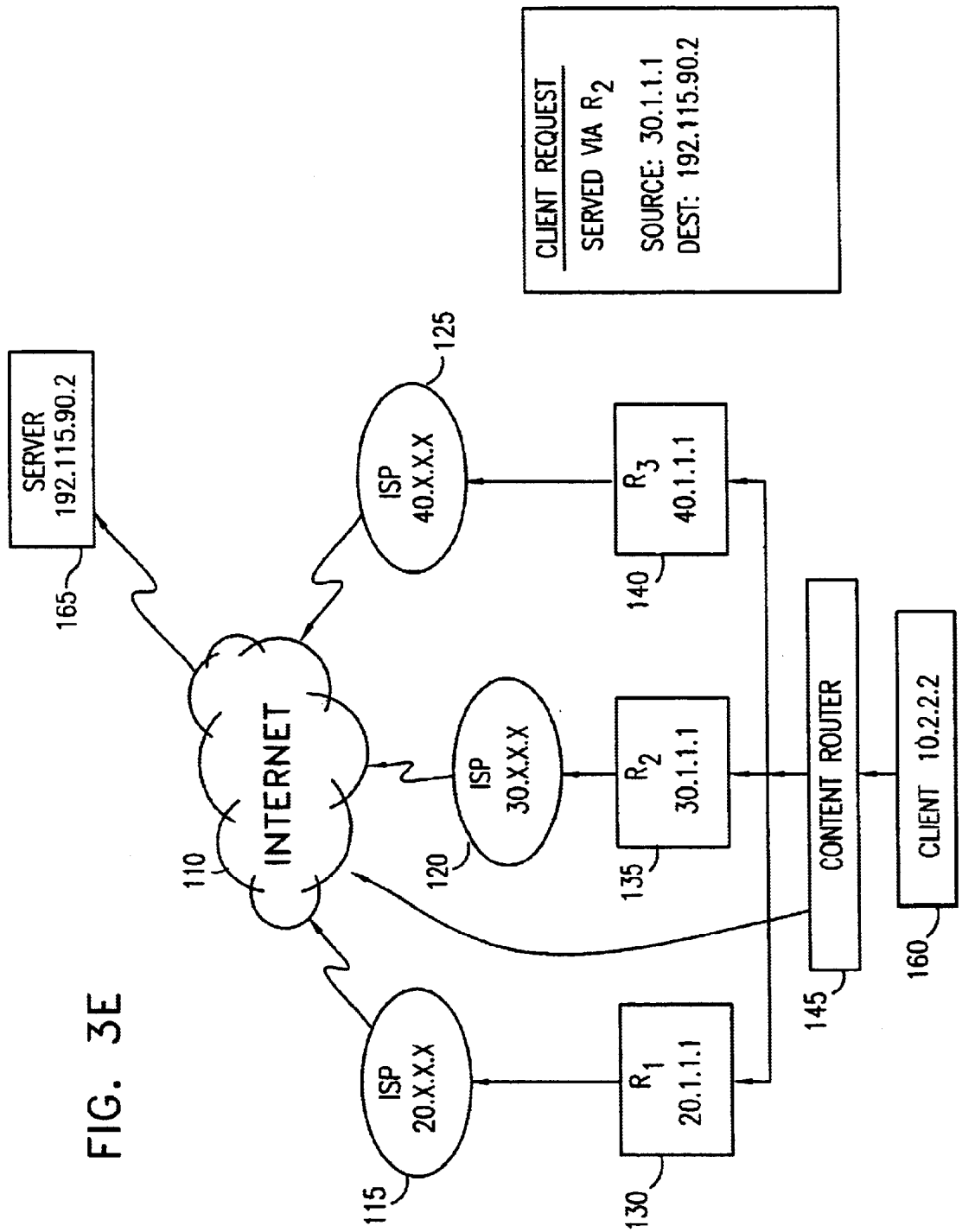

In turn, as illustrated in FIG. 3E, content router 145 sends requests issued from client 160 via router 135, and indicates a source IP address of 30.1.1.1 with each such request, which is the IP address associated with router 135 from within the range of IP addresses allocated by ISP 120.

As illustrated in FIG. 3F, this ensures that subsequent responses sent back from server 165 will be addressed to IP address 30.1.1.1 and, accordingly, will be routed through ISP 120. Content router 145 in turn uses network address translation (NAT) data to determine that IP address 30.1.1.1 corresponds to private IP address 10.2.2.2, and transmits the responses from server 165 back to client 160.

Figure 4A:
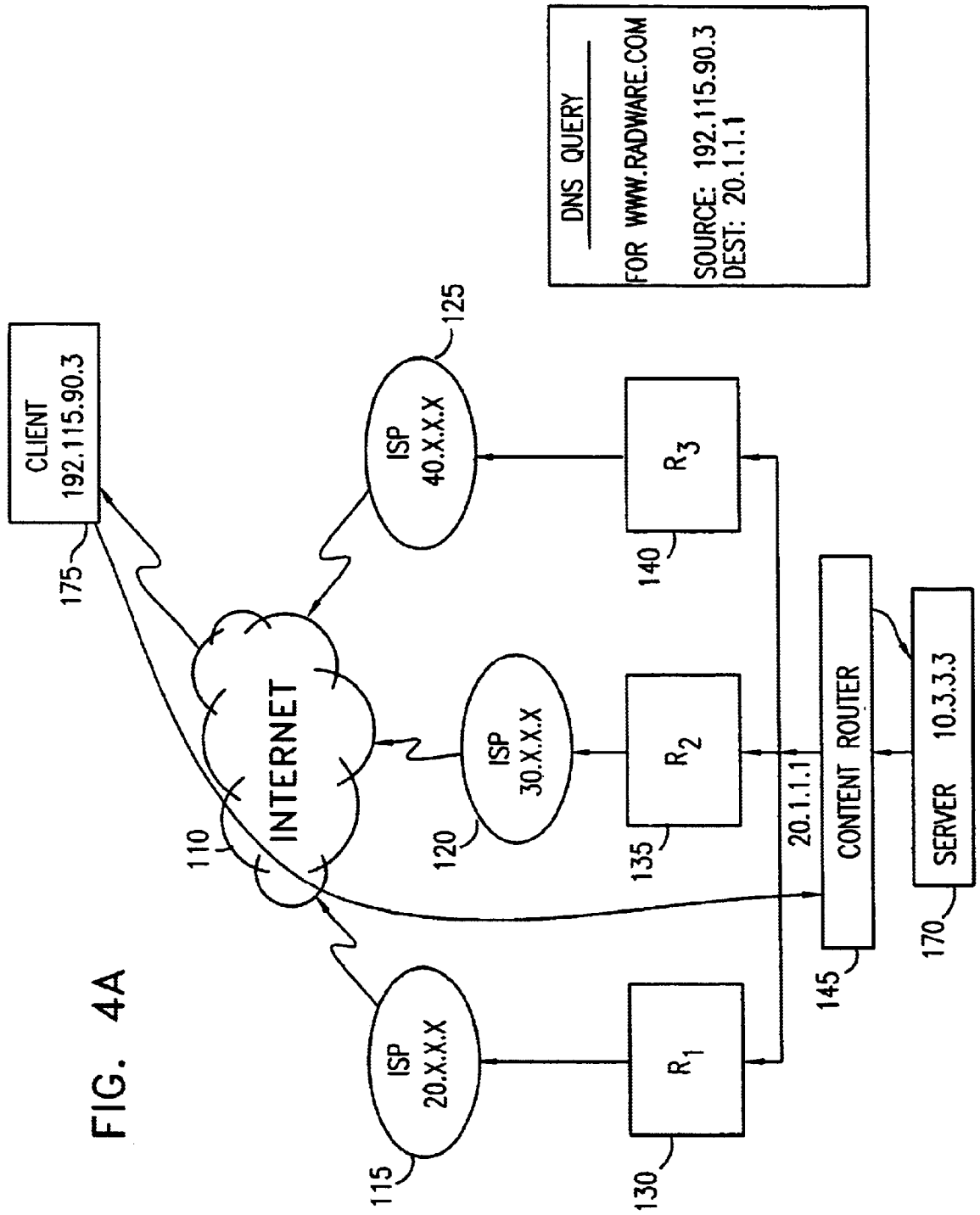
FIGS. 4A and 4B, taken together, are simplified pictorial illustrations of a preferred embodiment of the present invention used to resolve incoming DNS requests for a multi-homed network architecture.

Reference is now made to FIG. 4A, which illustrates a preferred embodiment of the present invention used to resolve incoming DNS requests for a multi-homed network architecture. Server 170 is assigned IP address 10.3.3.3 within a private multi-homed network, similar to the network illustrated in FIG. 3A. Each of ISPs 115, 120 and 125 assigns a range of IP addresses to the multi-homed network A DNS request for resolution of a domain name is issued from a client 175 with IP address 192.115.90.3. The DNS request has a source IP address of 192.115.90.3 and a destination IP address of 20.1.1.1. As such, it arrives at content router 145 via router 130.

Figure 4B:
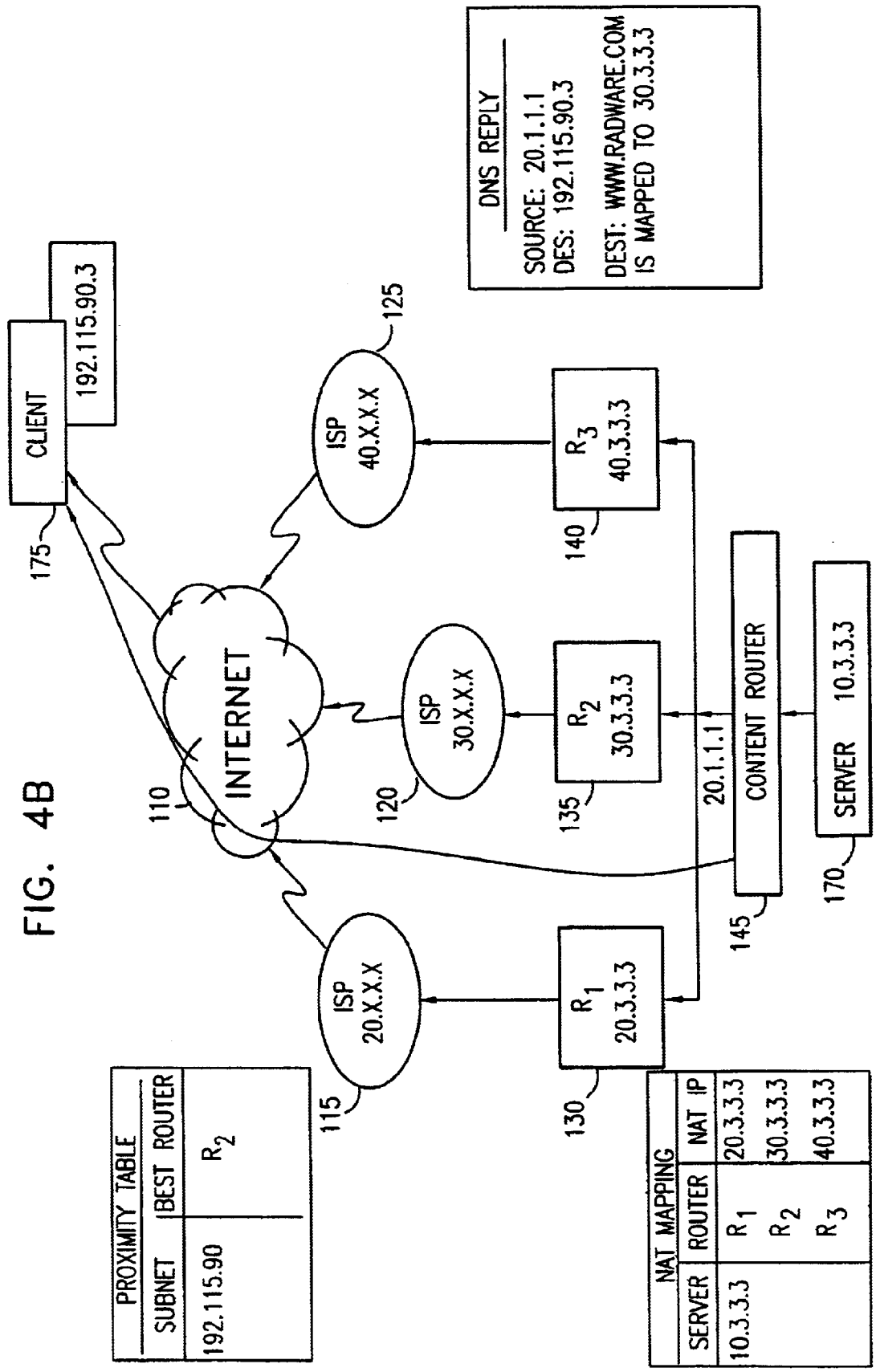

FIG. 4B indicates a NAT mapping table 180, showing that the private IP address 10.3.3.3 for server 170 is translated to IP addresses 20.3.3.3, 30.3.3.3 and 40.3.3.3, respectively, by routers 130, 135 and 140. Content router 145 looks up the subnet entry 192.115.90 in proximity table 155, and identifies router 135 as the first choice for best proximity between server 170 and client 175. In resolving the DNS request, content router 145 accordingly provides 30.3.3.3 as the IP address for the domain name server, even though the original request indicated a destination IP address of 20.1.1.1. This ensures that requests from client 175 are sent to server 170 with a destination IP address of 30.3.3.3, which in turn ensures that the client requests are transmitted through ISP 120.

It can be seen from FIGS. 3A–3F that the present invention efficiently balances the load among the three ISPs 115, 120 and 125 for outgoing connections. Similarly, it can be seen from FIGS. 4A and 4B that the present invention efficiently balances the load among the three ISPs 115, 120 and 125 for incoming connections. In the event that the router indicated as first choice for the best proximity connection is unavailable or overloaded, the present invention preferably uses a second choice router instead. Thus the present invention ensures that if an ISP service is unavailable, connectivity to the Internet is nevertheless maintained.

Referring back to FIG. 3F, suppose for example that ISP 120 is unavailable, and that content router 145 routes the outgoing client request through ISP 125 instead of through ISP 120. In accordance with a preferred embodiment of the present invention, content router 145 routes the outgoing request through ISP 125 and labels the outgoing request with a source IP address of 40.1.1.1. Had content router 145 used ISP 125 but indicated a source IP address of 30.1.1.1, the response from server 150 would be directed back through ISP 125, and not be able to get through to client 160.

Similarly, referring back to FIG. 4B, suppose for example that ISP 120 is unavailable, and that content router 145 resolves the DNS request with IP address 40.3.3.3 instead of IP address 30.3.3.3. This ensures that client 175 directs it requests through ISP 125, and avoids any blockage at ISP 120.

Figure 5:
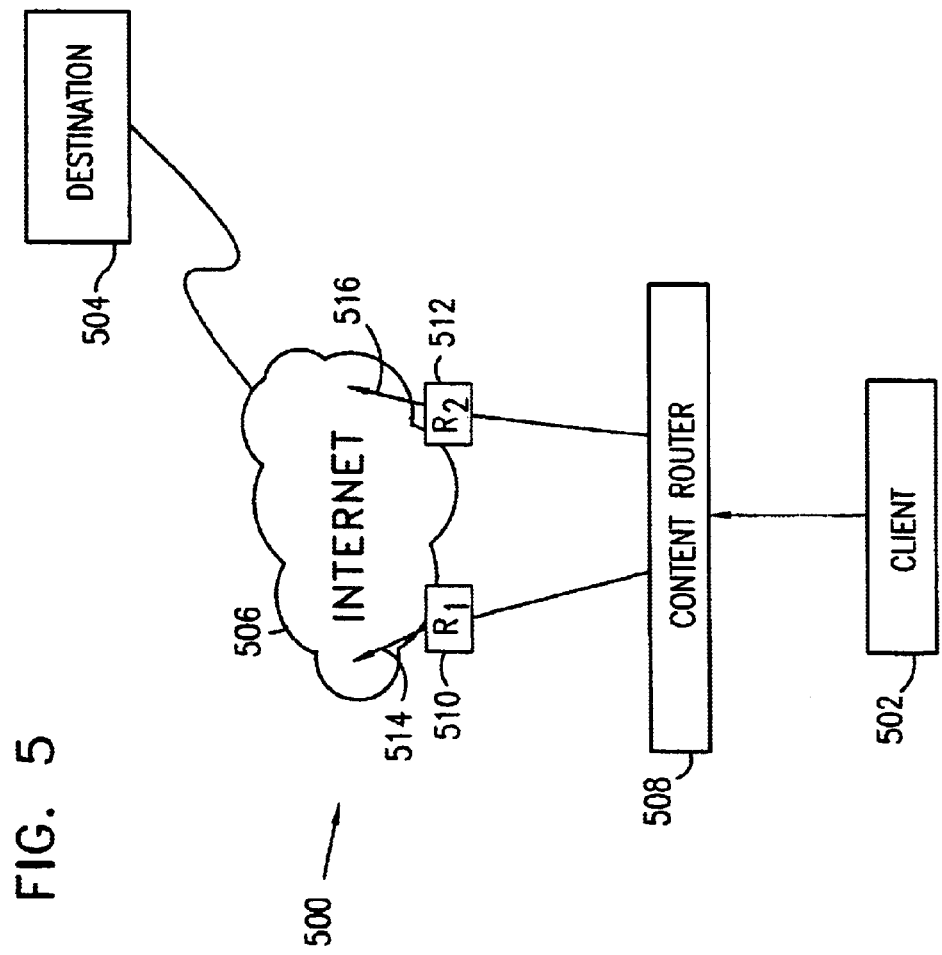
FIG. 5 illustrates a content routing system constructed and operative in accordance with yet another preferred embodiment of the present invention.

Reference is now made to FIG. 5, which illustrates a content routing system 500 constructed and operative in accordance with yet another preferred embodiment of the present invention. The content routing system 500, connects a client 502 to a destination 504 via a network system, such as the Internet network 506, using a content router 508. The content router 508 is connected to the Internet 506 typically via routers, $R_1$ 510 and $R_2$ 512. The content router 508 presents to the client 502 the most efficient pathway for choosing his connection to the destination 504. The routers 510 and 512 are connected to paths 514 and 516, respectively, and each path possess a path quality factor, $Q_1$ and $Q_2$, respectively.

The path quality factor $Q_i$ is defined as:
Path Quality Factor $Q_i$=Q(traffic load; packet loss; link pricing)

The path quality factor, for a given path, is typically dependent on the data content of the data packet. Typical path quality weighting factors are shown in Table 1 for the listed data content. It is appreciated that path quality factor is typically checked periodically, by the content router 508, for each Internet path.

It is appreciated that the managing of the routing, by the content router 508, typically depends on the following factors: the content type, the number of hops to the destination, the response time of the destination, the availability of the path, the costing of the link and the average packet loss in the link.

In order for the content router 508 to determine the "best" path, a "Decision Parameter Table" is built for each content type. It is appreciated that the content type may vary between the application type and actual content (URL requested, or any other attribute in the packet). The Decision Parameter Table is preferably dependent on the parameters: Data packet content; Hops weighting factor; Packet loss factor and Response time factor. Typical values of these parameters are also given in Table 1.

TABLE 1

| Content Type | Packet Loss, % | Hops, % | Response Time, % | Path Quality, % |
|---|---|---|---|---|
| HTTP | 0 | 20 | 60 | 20 |
| FTP | 30 | 0 | 50 | 20 |
| URL1 | 0 | 30 | 50 | 20 |
| URL2 | 0 | 30 | 50 | 20 |
| File Type 1 | 20 | 20 | 40 | 20 |
| File Type 2 | 20 | 10 | 30 | 40 |
| Telnet | 0 | 0 | 20 | 80 |

In addition to the parameters listed in Table 1, the following additional parameters may also be taken into consideration Hops count factor; Response time factor; Path quality factor; and Packet loss factor.

A Destination Table is built to summarize the following factors: the content type, the number of hops to the destination, the response time of the destination, the availability of the path, and the average packet loss in the link, based on proximity calculations, as previously defined.

Using the relevant data, as typically listed in Table 1, the content router 508 determines a Decision Function $F_{content}$ for each path:

$F_{content}$=F(Hops weighting actor*Hops count factor, Response weighting factor*Response time factor, Path quality weighting factor*Path quality factor, Packet loss weighting factor*Packet loss factor).

It is appreciated that the above parameters, which are used in the calculation of $F_{content}$, are typically normalized for each path.

Based on the Decision Function the content router 508 selects one of the available pats. The data packet is then routed through the selected path. The Decision Function for a particular path is determined by an administrative manager (not shown) and may depend, for example, on the minimum number of hops or on the relevant response time, or on the packet loss, or on the path quality, or any combination of the above parameters, according to the administrative preferences.

Figure 6:
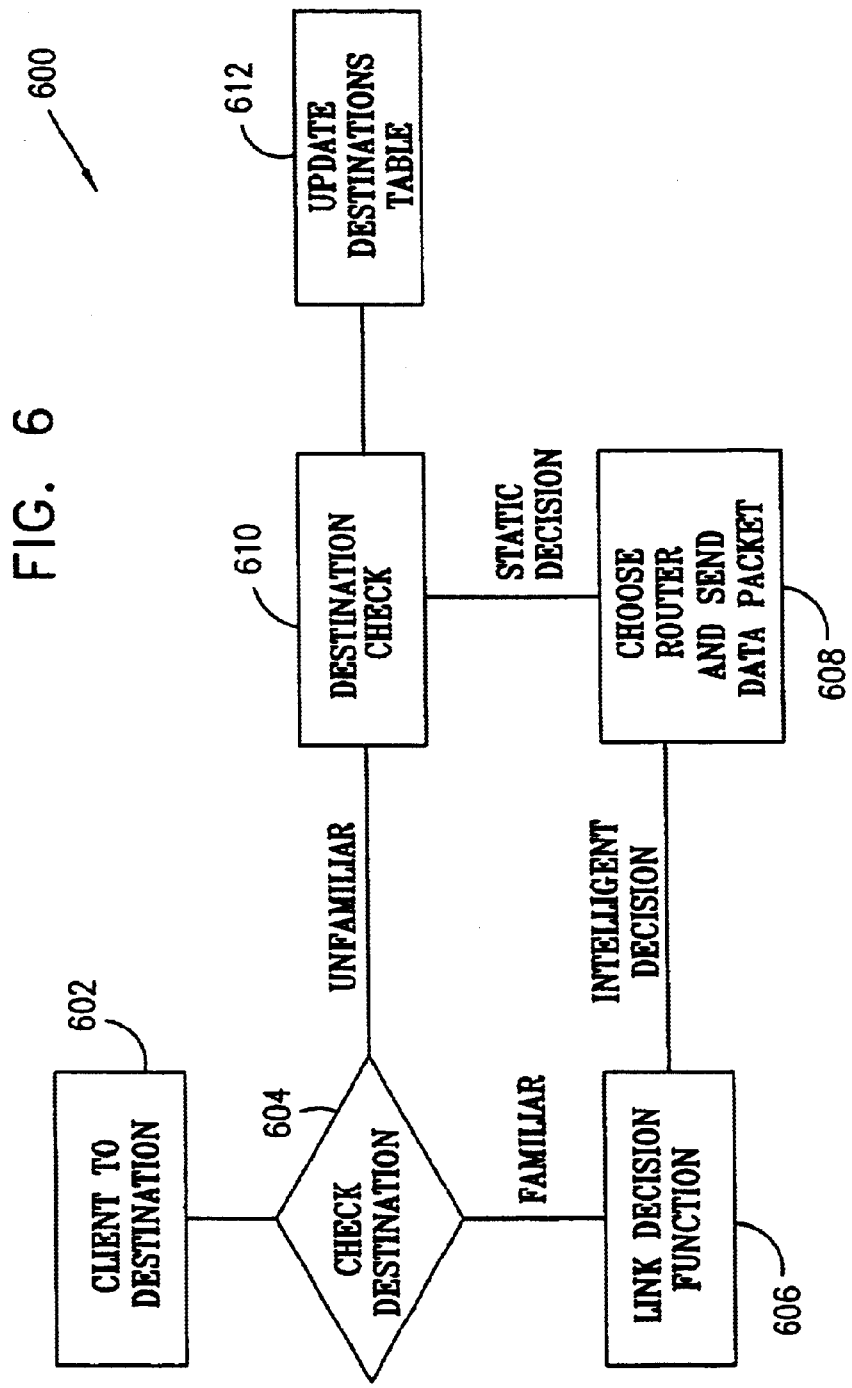
FIG. 6 is a simplified flowchart illustrating the operation of the content router in accordance with another preferred embodiment of the present invention.

The operation of the content router 508 is summarized in the flowchart 600 illustrated in FIG. 6. In the first step 602, the client 502 wishing to send a data packet to the destination 504, sends the data packet (step 602) to the content router 508. The content router 508 preferably first checks (step 604) to determine if the destination 504 is known (familiar) from the Destinations Table (FIG. 7) and that a previous check for the subnet of the destination 504 was: already performed. If the destination 504 is familiar, the content router 508 selects a link to the destination 504 using the $F_{content}$ function, taking into account the parameters that were gathered earlier (step 606). The $F_{content}$ fiction is normalized. The decision made in step 608 is then used by the content router 508 to make the connection with the destination 504 for routing the data packet.

If the destination 504 is unfamiliar, the content router 508 performs a destination check (step 610). The destination check is performed by using the proximity methods, as described hereinabove, by generating actual web traffic towards the destination subnet. This function, as carried out by the content router 508 comprises building a Destination Table (FIG. 7), for each available router and its respective path. The Destination Table may then be used by the content router 508 on the next occasion the client 502 wishes to transfer data packets to the destination 504. Consecutively, the content router 508 chooses the router (step 608) for transferring the data packet to the destination 504. This decision is preferably dependent on the path quality factor, as defined hereinabove.

Thus it may be appreciated that the present invention enables a multi-homed network architecture to realize the full benefits of its redundant route connections by maintaining fault tolerance and by balancing the load among these connections, and preferably using data packet content information in an intelligent decision making process.

It is appreciated that elements of the present invention described hereinabove may be implemented in hardware, software, or any suitable combination thereof using conventional techniques.

It is appreciated that the steps described with reference to FIGS. 1A–1C and 2A–2F need not necessarily be performed in the order shown unless otherwise indicated, and that in fact different implementations of the steps may be employed to yield similar overall results.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow.

What is claimed is:

1. A method for managing a computer network connected to the Internet through a plurality of routes, comprising the steps of:

receiving a request from a client within a client computer network directed to a remote server computer within a second computer network;

looking up a table entry within a proximity table indexed by an address related to the remote server computer, the tables entries of the proximity table containing ratings for a plurality of routes between the client computer network and the second computer network; and selecting one of the plurality of routes through which to route the client request, based on the ratings within the table entry looked up in the proximity tables, wherein the plurality of routes assign respective IP addresses to the computer network, and wherein the method further comprises the step of setting the source IP address of the client request corresponding to the selected route on the client side.

2. The method of claim 1 wherein the address related to the remote server is a subnet IP address of the remote server.

3. The method of claim 1 wherein the table entries contain the best three choices for routes through which to route the client request, and wherein said selecting step selects the best route, from among the best three choices for routes, that is available and not overloaded.

4. The method of claim 3 wherein said selecting step determines whether or not an route is overloaded based upon a user-configurable load threshold.

5. The method of claim 3 wherein said selecting step selects an route based on current load, in the event that all three of the best three choices for route are unavailable or overloaded.

6. The method of claim 1 wherein the computer network is a private network, visible externally through a network address translation.

7. The method of claim 6 further comprising the steps of:

receiving a response from the remote server directed to the source IP address designated for the client request; and translating the source IP address designated for the client request to the IP address for the client within the private network.

8. A network management system for managing a computer network connected to the Internet through a plurality of routes, comprising:

a network controller receiving a client request from within a client computer network directed to a remote server computers, within a second computer network and selecting one of a plurality of routes through which to route the client request; and a data manager looking up a table entry within a proximity table indexed by an address related to the remote server computer, the tables entries of the proximity table containing ratings for a plurality of routes, between the client computer network and the second computer network and wherein said network controller selects one of the plurality of routes based on the ratings within the table entry looked up in the proximity tables, wherein the plurality of routes assign respective IP addresses to the computer network, and wherein said network controller sets the source IP address of the client request corresponding to the selected route on the client side.

9. The network management system of claim 8 wherein the address related to the remote server is a subnet IP address of the remote server.

10. The network management system of claim 8 wherein the table entries contain the best three choices for routes through which to route the client request, and wherein said network controller selects the best route, from among the best three choices for routes, that is available and not overloaded.

11. The network management system of claim 10 wherein said network controller determines whether or not a route is overloaded based upon a user-configurable load threshold.

12. The network management system of claim 10 wherein said network controller selects a route based on current load, in the event that all three of the best three choices for route are unavailable or overloaded.

13. The network management system of claim 8 wherein the computer network is a private network, visible externally through a network address translation.

14. The network management system of claim 13 wherein said network controller receives a response from the remote server directed to the source IP address designated for the client request, the system further comprising a network address translator translating the source IP address designated for the client request to the IP address for the client within the private network.

* * * * *

UNITED STATES PATENT AND TRADEMARK OFFICE
CERTIFICATE OF CORRECTION

PATENT NO. : 6,665,702 B1
DATED : December 16, 2003
INVENTOR(S) : Roy Zisapel et al.

It is certified that error appears in the above-identified patent and that said Letters Patent is hereby corrected as shown below:

Title page,
Item [57], ABSTRACT,
Line 4, "of;" should read -- of: --.

Column 19,
Line 42, "tables" should read -- table --.
Line 62, "an route" should read -- a route --.

Column 20,
Line 2, "an route" should read -- a route --.
Line 20, "computers," should read -- computer --.
Line 25, "tables" should read -- table --.
Line 26, "routes," should read -- routes --.
Line 30, "tables," should read -- table, --.

Signed and Sealed this

Tenth Day of August, 2004

JON W. DUDAS
*Acting Director of the United States Patent and Trademark Office*